United States Patent
Kwon et al.

(10) Patent No.: US 10,291,695 B2
(45) Date of Patent: May 14, 2019

(54) METHOD AND APPARATUS AND COMPUTER READABLE RECORD MEDIA FOR COMMUNICATION ON WI-FI DIRECT MULTI-GROUP NETWORK

(71) Applicant: ANYFI INC, Gyeonggi-do (KR)

(72) Inventors: Do Hyeong Kwon, Seoul (KR); Ki Suk Jang, Seoul (KR)

(73) Assignee: ANYFI INC, Gyeonggi-do (KR)

( * ) Notice: Subject to any disclaimer, the term of this patent is extended or adjusted under 35 U.S.C. 154(b) by 0 days.

(21) Appl. No.: 15/546,788

(22) PCT Filed: Mar. 6, 2017

(86) PCT No.: PCT/KR2017/002361
§ 371 (c)(1),
(2) Date: Jul. 27, 2017

(87) PCT Pub. No.: WO2018/004106
PCT Pub. Date: Jan. 4, 2018

(65) Prior Publication Data
US 2018/0219944 A1    Aug. 2, 2018

(30) Foreign Application Priority Data
Jun. 28, 2016 (KR) .................. 10-2016-0080607

(51) Int. Cl.
*H04L 29/08* (2006.01)
*H04W 4/08* (2009.01)
(Continued)

(52) U.S. Cl.
CPC ............ *H04L 67/104* (2013.01); *H04L 29/08* (2013.01); *H04L 67/34* (2013.01); *H04W 4/08* (2013.01);
(Continued)

(58) Field of Classification Search
CPC .. H04L 67/104; H04L 67/1061; H04L 67/161; H04L 29/06326; H04L 29/08306;
(Continued)

(56) References Cited

U.S. PATENT DOCUMENTS 10,085,236 B2 * 9/2018 Yoon ................. H04W 28/0289
2002/0002605 A1 * 1/2002 Honda ..................... H04L 29/06
709/219

(Continued)

FOREIGN PATENT DOCUMENTS

KR    10-2011-0022702 A    3/2011
KR    10-2012-0052092 A    5/2012
(Continued)

OTHER PUBLICATIONS

Korean Office Action dated Sep. 7, 2016 of corresponding application No. 10-2016-008067; 5 pgs.
(Continued)

*Primary Examiner* — Warner Wong
(74) *Attorney, Agent, or Firm* — Maier & Maier, PLLC

(57) ABSTRACT

A method and apparatus and computer readable record media for communication on a Wi-Fi direct multi-group network. A method for communication in the Wi-Fi direct multi-group network comprising receiving, by a Wi-Fi direct multi-group network server, a request for transmission of a Wi-Fi direct communication application for a Wi-Fi direct multi-group communication service from an user equipment (UE) directly or indirectly through a relay server; and transmitting, by the Wi-Fi direct multi-group network server, the Wi-Fi direct communication application to the UE directly or indirectly through the relay server, wherein the Wi-Fi direct communication application determines destination address information for communication of the UE in the Wi-Fi direct multi-group network.

8 Claims, 13 Drawing Sheets

(51) Int. Cl.
  *H04W 84/12*  (2009.01)
  *H04W 84/20*  (2009.01)
  *H04W 88/18*  (2009.01)
  *H04W 4/70*  (2018.01)
  *H04W 76/10*  (2018.01)
  *H04L 29/06*  (2006.01)
  *H04W 4/60*  (2018.01)

(52) U.S. Cl.
  CPC ............. *H04W 4/70* (2018.02); *H04W 76/10* (2018.02); *H04W 84/12* (2013.01); *H04W 84/20* (2013.01); *H04W 88/18* (2013.01); *H04L 29/06326* (2013.01); *H04W 4/60* (2018.02)

(58) Field of Classification Search
  CPC .......... H04L 29/08585; H04L 61/2069; H04L 63/065; H04L 63/104; H04L 65/1069; H04W 4/60; H04W 4/70; H04W 88/18; H04W 88/04; H04W 76/10; H04W 76/14; H04W 76/23; H04W 72/121; H04W 40/22; H04W 52/46; H04N 21/632
  See application file for complete search history.

(56) References Cited

U.S. PATENT DOCUMENTS

| | | | | |
|---|---|---|---|---|
| 2002/0116615 A1* | 8/2002 | Nguyen | ............... | G06F 21/10 713/168 |
| 2003/0216927 A1* | 11/2003 | Sridhar | ............... | G06F 9/44589 713/176 |
| 2006/0046810 A1* | 3/2006 | Tabata | ............... | A63F 13/12 463/9 |
| 2006/0223518 A1* | 10/2006 | Haney | ............... | H04W 4/21 455/420 |
| 2010/0273450 A1* | 10/2010 | Papineau | ............... | G06F 8/60 455/411 |
| 2011/0034127 A1* | 2/2011 | Wentink | ............... | H04W 76/022 455/41.2 |
| 2012/0322368 A1* | 12/2012 | Desai | ............... | H04W 12/02 455/41.1 |
| 2013/0040576 A1* | 2/2013 | Yoon | ............... | H04W 8/005 455/41.2 |
| 2013/0065627 A1* | 3/2013 | Jung | ............... | H04W 76/15 455/515 |
| 2013/0083722 A1* | 4/2013 | Bhargava | ............... | H04W 48/20 370/315 |
| 2014/0119356 A1* | 5/2014 | Huang | ............... | H04W 76/023 370/338 |
| 2015/0016354 A1* | 1/2015 | Yie | ............... | H04L 5/003 370/329 |
| 2015/0264123 A1* | 9/2015 | Smadi | ............... | H04W 4/12 709/206 |
| 2015/0382391 A1* | 12/2015 | Hamachi | ............... | H04W 76/14 370/329 |
| 2016/0127424 A1* | 5/2016 | Lee | ............... | H04W 48/16 370/315 |
| 2016/0150443 A1* | 5/2016 | Suryavanshi | ....... | H04L 67/1042 370/331 |
| 2016/0234626 A1* | 8/2016 | Ray | ............... | H04W 4/005 |
| 2016/0295413 A1* | 10/2016 | Liu | ............... | H04W 4/08 |
| 2016/0338123 A1* | 11/2016 | Yang | ............... | H04W 48/18 |
| 2017/0019839 A1* | 1/2017 | Li | ............... | H04W 88/04 |
| 2017/0027009 A1* | 1/2017 | Dumpala | ............... | H04B 7/15507 |
| 2017/0048097 A1* | 2/2017 | Kavatage | ............... | H04L 41/04 |
| 2017/0094604 A1* | 3/2017 | Yang | ............... | H04B 7/04 |
| 2017/0196034 A1* | 7/2017 | Jung | ............... | H04W 76/23 |
| 2017/0223579 A1* | 8/2017 | Lee | ............... | H04W 48/14 |
| 2017/0280469 A1* | 9/2017 | Park | ............... | H04W 24/10 |
| 2017/0366919 A1* | 12/2017 | Lim | ............... | H04W 72/12 |
| 2018/0033053 A1* | 2/2018 | Barak | ............... | G06Q 30/0271 |
| 2018/0218354 A1* | 8/2018 | Kumar | ............... | G06Q 20/29 |
| 2018/0332640 A1* | 11/2018 | Jung | ............... | H04W 12/06 |
| 2018/0343547 A1* | 11/2018 | Chaki | ............... | H04W 8/005 |
| 2018/0359664 A1* | 12/2018 | Kim | ............... | H04W 36/00 |

FOREIGN PATENT DOCUMENTS

| | | |
|---|---|---|
| KR | 10-2012-0124318 A | 11/2012 |
| KR | 10-2013-0085080 A | 7/2013 |
| KR | 10-2016-0053594 A | 5/2016 |

OTHER PUBLICATIONS

International Search Report dated Jun. 21, 2017 of corresponding application No. PCT/KR2017/002361; 5 pgs.

* cited by examiner

FIG. 1
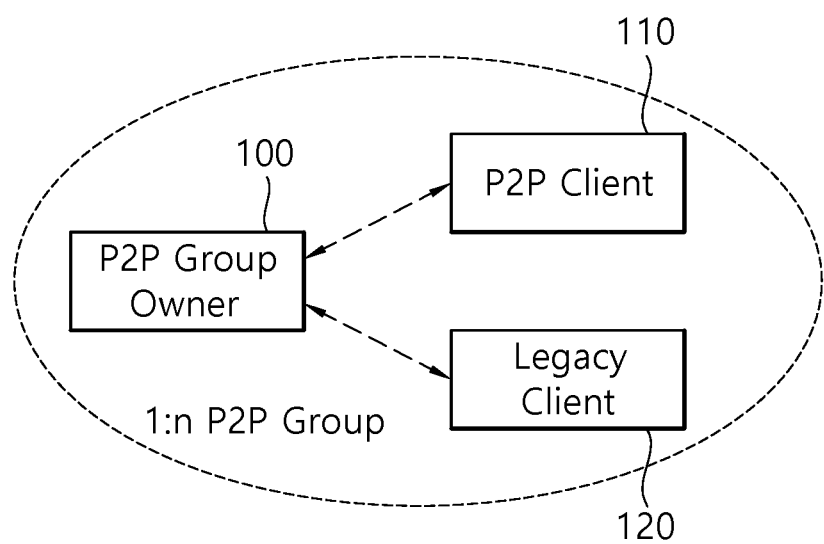
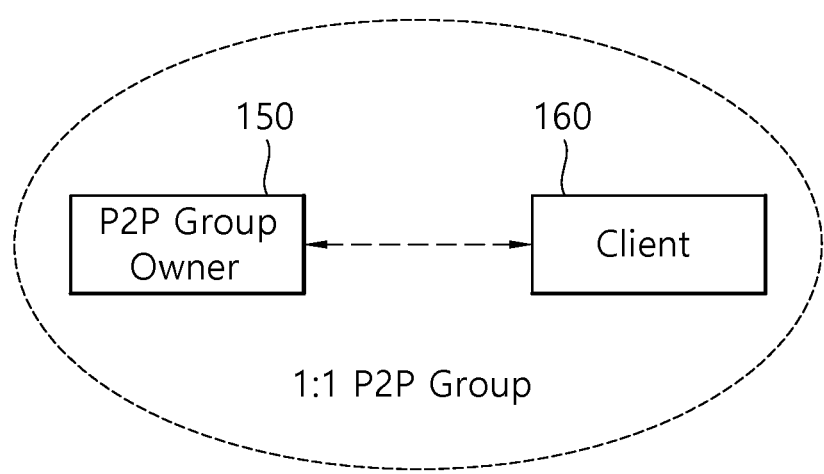

METHOD AND APPARATUS AND COMPUTER READABLE RECORD MEDIA FOR COMMUNICATION ON WI-FI DIRECT MULTI-GROUP NETWORK

FIELD OF THE INVENTION

The present invention relates to a method, apparatus, and computer-readable recording medium for communication in a wireless fidelity (Wi-Fi) direct multi-group network, and more particularly, to a method, apparatus, and computer-readable recording medium for communication in a Wi-Fi direct multi-group network which are intended to solve a problem caused by a depletion of wireless resources following an increase in demand for mobile network data and relieve the burden of telecommunication expenses following an increase in the amount of mobile network data used by a user.

RELATED ART

With the proliferation of user equipment (UE) such as a smart phone and a tablet, high-capacity multimedia communication has been activated, and the amount of wireless network traffic is drastically increasing every year. Due to such an increase in the amount of wireless network traffic, an overload of a cellular network becomes heavy. To relieve an overload of a cellular network, communication service providers are trying to reduce inter-cell interference by converting a cellular network into a centralized base station structure. Also, to solve the problem of traffic overload, communication service providers are trying to distribute wireless network traffic using not only long term evolution (LTE), LTE-advanced (A), and fifth generation (5G) cellular networks but also other kinds of wireless networks (e.g., a wireless local area network (WLAN)).

Specifically, communication service providers try to reduce traffic overload by changing and extending infrastructure networks based on base stations and access points (APs). As another method of reducing overload of a base station, direct inter-terminal communication (or device-to-device (D2D) communication) in which traffic is directly transmitted and received between pieces of UE instead of communication through an infrastructure network based on a base station and an AP is under research.

D2D communication enables direct communication between pieces of UE without a base station or an AP. In comparison with an existing method of communicating through a base station and an AP, D2D communication has various advantages. Specifically, D2D communication can reduce load of an existing wireless network through direct communication between pieces of UE. Also, D2D communication enables reuse of wireless frequency resources that are used in an existing wireless network and thus can improve efficiency in use of wireless resources. Further, when D2D communication is used, a delay which occurs during communication is reduced, power consumption of UE may be reduced, and communication coverage may be extended on the basis of relay communication between pieces of UE.

However, when UE using the Android operating system (OS) currently performs Wi-Fi peer-to-peer (P2P) communication which is WLAN-based D2D communication, it is not possible to extend a D2D communication network due to a probability of an Internet protocol (IP) address conflict between pieces of UE.

SUMMARY OF THE INVENTION

An aspect of the present invention is to solve all the problems described above.

Another aspect of the present invention is to solve a problem caused by a depletion of wireless resources following an increase in demand for wireless network traffic on the basis of a wireless fidelity (Wi-Fi) direct multi-group network.

Another aspect of the present invention is to remove the burden of a user's telecommunication expenses following an increase in the amount of wireless network traffic used by the user on the basis of a Wi-Fi direct multi-group network.

To achieve the foregoing aspects of the present invention, the present invention is representatively configured as follows.

According to an embodiment of the present invention, a method for communication in a wireless fidelity (Wi-Fi) direct multi-group network, the method comprising: receiving, by a Wi-Fi direct multi-group network server, a request for transmission of a Wi-Fi direct communication application for a Wi-Fi direct multi-group communication service from user equipment (UE) directly or indirectly through a relay server; and transmitting, by the Wi-Fi direct multi-group network server, the Wi-Fi direct communication application to the UE directly or indirectly through the relay server, wherein the Wi-Fi direct multi-group network is formed based on at least one peer-to-peer (P2P) group for performing direct inter-terminal communication based on Wi-Fi direct, and wherein the Wi-Fi direct communication application determines destination address information for communication of the UE in the Wi-Fi direct multi-group network.

According to another embodiment of the present invention A wireless fidelity (Wi-Fi) direct multi-group network server for communication in a Wi-Fi direct multi-group network, comprising: a communication unit configured to communicate with a relay server and an user equipment (UE); and a processor operatively connected to the communication unit and configured to: receive a request for transmission of a Wi-Fi direct communication application for a Wi-Fi direct multi-group communication service from the UE directly or indirectly through a relay server; and transmit the Wi-Fi direct communication application to the UE directly or indirectly through the relay server, wherein the Wi-Fi direct multi-group network is formed based on at least one peer-to-peer (P2P) group for performing direct inter-terminal communication based on Wi-Fi direct, and wherein the Wi-Fi direct communication application determines destination address information for communication of the UE in the Wi-Fi direct multi-group network.

The present invention can solve a problem caused by a depletion of wireless resources following an increase in demand for wireless network traffic on the basis of a wireless fidelity (Wi-Fi) direct multi-group network.

Also, the present invention can remove the burden of a user's telecommunication expenses following an increase in the amount of wireless network traffic used by the user on the basis of a Wi-Fi direct multi-group network.

BRIEF DESCRIPTION OF THE DRAWINGS

FIG. 1 is a conceptual diagram of a P2P topology supported by Wi-Fi direct.

DESCRIPTION OF EXEMPLARY EMBODIMENTS

Figure 2:
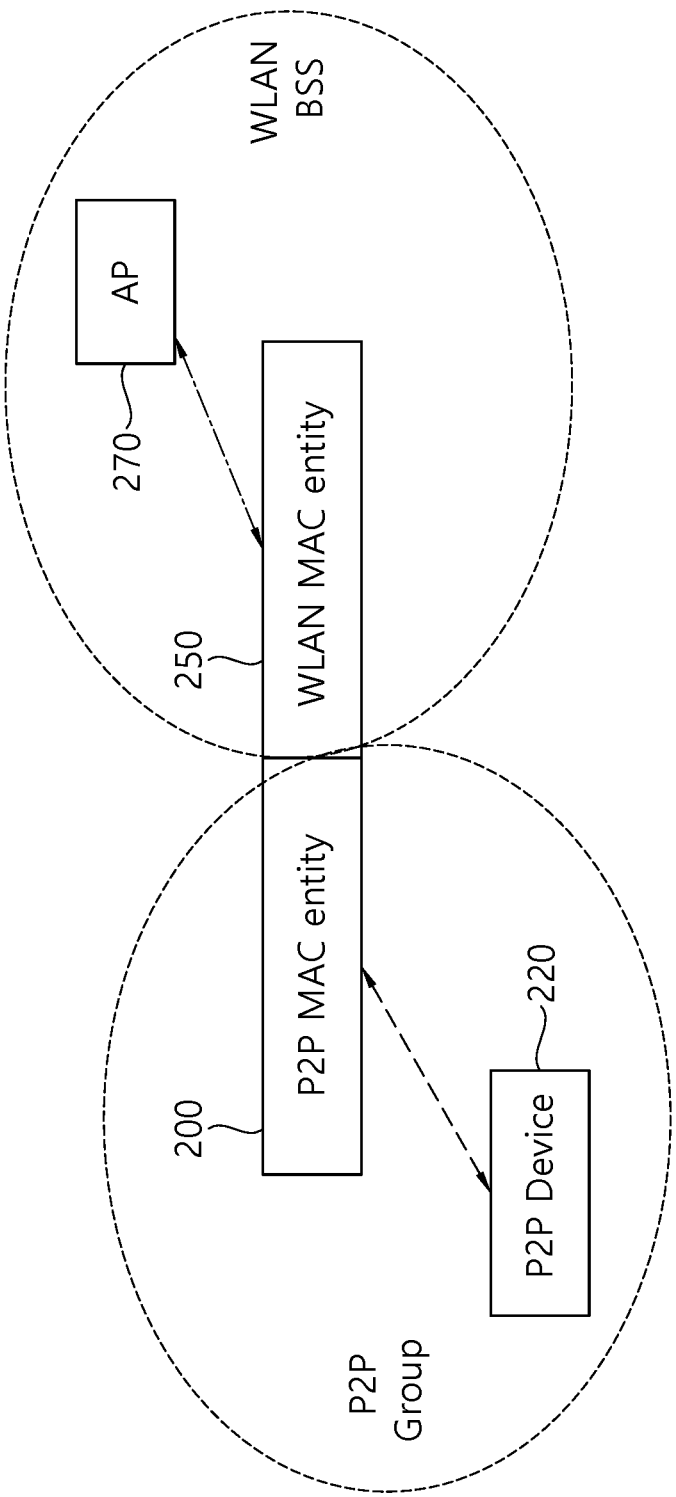
FIG. 2 is a conceptual diagram showing concurrent operations of a P2P device in a WLAN and a Wi-Fi direct network.

The following detailed description of the present invention shows a specific embodiment of the present invention and will be given with reference to the accompanying drawings. The embodiment will be described in sufficient detail so that those of ordinary skill in the art can implement the present invention. It should be understood that various embodiments of the present invention are different from each other and do not necessarily exclude each other. For example, a particular shape, structure, and characteristic described in this specification may be implemented in other embodiments without departing from the spirit and scope of the present invention with reference to an embodiment. It should also be noted that the positions and orientations of the individual components in each embodiment can be varied without departing from the spirit and scope of the present invention. Therefore, the following detailed description is not intended to be limiting, and the scope of the present invention includes the appended claims and equivalents thereof. Like reference numerals in the drawings denote the same or similar components in many aspects.

Hereinafter, exemplary embodiments of the present invention will be described in detail with reference to the accompanying drawings so that those of ordinary skill in a technical field to which the present invention pertains can readily implement the present invention.

From now, user equipment (UE) may also be referred to as various names, such as mobile terminal, wireless device, wireless transmit/receive unit (WTRU), mobile station (MS), mobile subscriber unit, user, or the like. For example, UE may be a device such as a smart phone, a tablet, or a laptop computer.

A communication method between pieces of UE in a wireless fidelity (Wi-Fi) direct multi-group network will be disclosed below. A Wi-Fi direct multi-group network is a network of a plurality of peer-to-peer (P2P) groups formed on the basis of Wi-Fi direct (or Wi-Fi P2P). Wi-Fi direct (or Wi-Fi P2P) may denote technology for direct communication between pieces of UE (e.g., smart phones) without using a network infrastructure, such as an access point (AP) and a base station (e.g., an evolved node base station (e-Node B)). For example, Wi-Fi direct may be technology for supporting direct communication between pieces of UE based on Wi-Fi P2P technical specifications disclosed by Wi-Fi Alliance.

In exemplary embodiments of the present invention, a P2P group owner may be interpreted as P2P group owner UE, a P2P client may be interpreted as P2P client UE, a legacy client may be interpreted as legacy UE, a gateway may be interpreted as gateway UE, and a spoke may be interpreted as spoke UE.

FIG. 1 is a conceptual diagram of a P2P topology supported by Wi-Fi direct.

FIG. 1 shows a P2P topology in which pieces of UE are coupled on a one-to-n basis (n is a natural number). In the P2P topology, one piece of UE may be set to a P2P group owner, and at least one piece of other UE may be set to a P2P client or a legacy client.

The P2P group owner and the P2P client may be pieces of UE which perform direct communication through a P2*P media* access control (MAC) entity for supporting Wi-Fi direct. The legacy client may be UE that communicates with the P2P group owner through a wireless local area network (WLAN) MAC entity for supporting communication in a WLAN, which is an existing infrastructure network, rather than a P2P MAC entity supporting Wi-Fi P2P.

The P2P group owner and the P2P client may also support communication based on a WLAN which is an existing infrastructure network.

Referring to an upper diagram of FIG. 1, coupling of one P2P group owner 100 and two clients (a P2P client 110 and a legacy client 120) is shown as an example of a 1:n P2P group.

Referring to a lower diagram of FIG. 1, coupling of one P2P group owner 150 and one client (P2P client or legacy client) 160 is shown as an example of a 1:1 P2P group.

In Wi-Fi direct communication, UE for serving as a P2P group owner and UE for serving as a client may be determined from among a plurality of pieces of UE through a group formation procedure.

Specifically, the P2P group owner is an AP-like entity which serves as an AP and may provide functionality and service supported on the basis of a basic service set (BSS) in an existing WLAN to a P2P client or a legacy client coupled to the P2P group owner. For example, the P2P group owner may support communication between clients coupled thereto. Also, the P2P group owner may support not only Wi-Fi direct communication but also a client coupled thereto (a P2P client or a legacy client) to simultaneously access an infrastructure network, such as a WLAN. A P2P group may include only one P2P group owner or one P2P group owner and at least one client (a P2P client and a legacy client). Also, the P2P devices (the P2P group owner and the P2P client) may operate as one or more members of the P2P group.

FIG. 2 is a conceptual diagram showing concurrent operations of a P2P device in a WLAN and a Wi-Fi direct network.

FIG. 2 shows support of WLAN-based communication for a P2P group owner and a P2P client which are P2P devices supporting Wi-Fi direct.

Referring to FIG. 2, a P2P device (the P2P group owner and the P2P client) may operate in a WLAN and a Wi-Fi direct network at the same time. The P2P device may support a plurality of MAC entities, and a plurality of different communication networks may be individually supported on the basis of the plurality of MAC entities. Specifically, the P2P device may include a P2P MAC entity 200 for communication in the Wi-Fi direct network and a WLAN MAC entity 250 for communication in the WLAN. For example, the P2P device may form a P2P group with another P2P device 220 through the P2P MAC entity 200 and perform communication in the Wi-Fi direct network. Also, as a WLAN station (WLAN-STA), the P2P device may form a WLAN BSS with an AP 270 through the WLAN MAC entity 250 and perform communication in the WLAN.

A plurality of MAC entities may be implemented in one P2P device in various ways. For example, two individual physical MAC entities may be coupled to individual physical (PHY) entities in a P2P device. Alternatively, two virtual MAC entities may be implemented in one PHY device. In various ways other than those mentioned above, a plurality of MAC entities may be implemented in one P2P device.

The P2P group may currently communicate on the basis of Wi-Fi direct using frequency resources (an operating class and an operating channel) which are the same as or different from the WLAN BSS. For example, the WLAN BSS may use channel 36 as frequency resources in the 5.2 GHz band, and the P2P group may use channel 6 as frequency resources in the 2.4 GHz band.

A Wi-Fi direct network may be extended as a Wi-Fi direct multi-group network on the basis of a plurality of P2P groups.

From now, transmission from a client (a P2P client or a legacy client) to a P2P group owner in a Wi-Fi direct multi-group network (or a Wi-Fi direct network) may be referred to as uplink transmission, and transmission from the P2P group owner to the client may be referred to as downlink transmission.

When a specific piece of UE among a plurality of pieces of UE operating on the basis of the Android OS in the Wi-Fi direct multi-group network currently performs uplink transmission of data (or packets), the uplink transmission may fail due to an IP address conflict. This is because a P2P group owner operates as a dynamic host configuration protocol (DHCP) server and for this reason, all pieces of UE operating as P2P group owners are assigned the same IP version 4 (IPv4) address. This will be described in detail below.

Therefore, due to such an IP address conflict in uplink transmission, extension of a Wi-Fi direct multi-group network is currently impossible. The present invention is intended to solve the problem of extension of a Wi-Fi direct multi-group network caused by an IP address conflict. IP addresses disclosed in exemplary embodiments of the present invention below are example values and may be changed.

Figure 3:
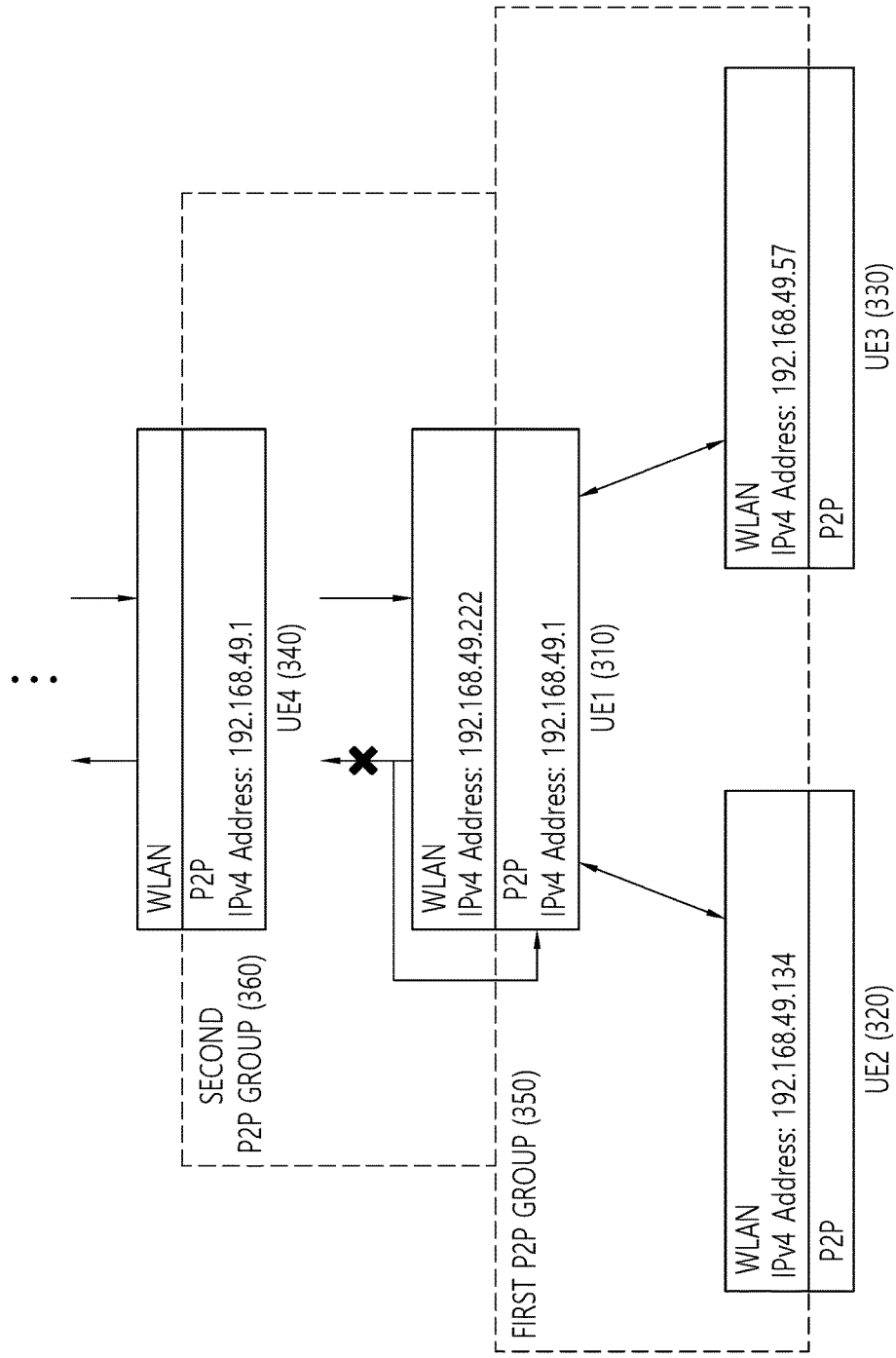
FIG. 3 is a conceptual diagram showing a Wi-Fi direct multi-group network.

FIG. 3 is a conceptual diagram showing a Wi-Fi direct multi-group network.

FIG. 3 discloses a Wi-Fi direct multi-group network including a plurality of P2P groups formed on the basis of gateways.

Referring to FIG. 3, a Wi-Fi direct multi-group network including two P2P groups (a first P2P group 350 and a second P2P group 360) is disclosed. The first P2P group 350 and the second P2P group 360 may be connected (or bridged) on the basis of UE1 310 operating as a gateway and form a Wi-Fi direct multi-group network. UE1 310 may serve as a P2P group owner in the first P2P group 350 and serve as a client in the second P2P group 360.

From now, UE which provides connectivity in a Wi-Fi direct multi-group network may be expressed with the term "gateway" or "gateway node."

More specifically, UE which provides connectivity through two MAC entities in a Wi-Fi direct multi-group network to connect at least two P2P groups may be expressed by the term "gateway" or "gateway node."

As shown in FIG. 3, a device which serves as both a P2P group owner and a client to connect the first P2P group 350 and the second P2P group 360 may be a gateway. The gateway provides connectivity in the Wi-Fi direct multi-group network, and the Wi-Fi direct multi-group network may be extensible on the basis of the gateway.

UE which operates on the basis of only one MAC entity in the Wi-Fi direct multi-group network and does not provide connectivity between P2P groups may be expressed by the term "non-gateway" or "non-gateway node."

The first P2P group 350 may include gateway1 (UE1 310), non-gateway1 (UE2 320), and non-gateway2 (UE3 330). As the P2P group owner, gateway1 (UE1 310) may communicate with non-gateway1 (UE2 320) and non-gateway2 (UE3 330) in the first P2P group on the basis of Wi-Fi direct using a P2P MAC entity. An IP address for Wi-Fi direct communication based on the P2P MAC entity may be 192.168.49.1 assigned on the basis of IPv4.

Non-gateway1 (UE2 320) and non-gateway2 (UE3 330) are legacy clients and may communicate with gateway1 (UE1 310) on the basis of Wi-Fi direct by recognizing gateway1 (UE1 310), which operates as the P2P group owner, as an AP. Specifically, non-gateway1 (UE2 320) and non-gateway2 (UE3 330) are assigned different IPv4 addresses (192.168.49.134 (non-gateway1) and 192.168.49.57 (non-gateway2)) from gateway1 (UE1 310) which operates as the P2P group owner and may perform uplink transmission through WLAN MAC entities by setting the IPv4 address (192.168.49.1) of gateway1 (UE1 310) as a destination address.

Conversely, gateway1 (UE1 310) may perform downlink transmission to each of non-gateway1 (UE2 320) and non-gateway2 (UE3 330) using the different IPv4 addresses of non-gateway1 (UE2 320) and non-gateway2 (UE3 330).

In other words, the problem of an IP address conflict may not be caused in the first P2P group 350 when uplink transmission and downlink transmission are performed.

The second P2P group 360 may include gateway1 (UE1 310) and gateway2 (UE4 340).

In the second P2P group 360, gateway1 (UE1 310) operates as a legacy client to communicate with gateway2 (UE4 340) through a WLAN MAC entity on the basis of Wi-Fi direct. An IPv4 address assigned to gateway1 (UE1 310) for Wi-Fi direct communication using the WLAN MAC entity may be 192.168.49.222.

Gateway2 (UE4 340) may communicate with gateway1 (UE1 310) on the basis of Wi-Fi direct using a P2P MAC entity. An IPv4 address assigned to gateway2 (UE4 340) for communication based on the P2P MAC entity of gateway2 (UE4 340) may be 192.168.49.1.

Since 192.168.49.222 which is the IPv4 address assigned to gateway1 (UE1 310) for communication based on the WLAN MAC entity is not a value conflicting with other IP addresses, downlink transmission may be performed without the problem of an IP address conflict in the second P2P group 360. Specifically, gateway2 (UE4 340) may perform downlink transmission by setting 192.168.49.222 which is the IPv4 address of gateway1 (UE1 310) as a destination address.

On the other hand, as mentioned above, when pieces of UE operating on the basis of the Android OS currently form a Wi-Fi direct multi-group network, pieces of UE serving as P2P group owners in the Wi-Fi direct multi-group network are assigned the same IPv4 address for Wi-Fi direct communication based on P2P MAC entities.

In other words, the IPv4 address (192.168.49.1) assigned for Wi-Fi direct communication using the P2P MAC entity of gateway2 (UE4 340) operating as the P2P group owner in the second P2P group 360 has the same value as the IPv4 address (192.168.49.1) assigned for Wi-Fi direct communication using the P2P MAC entity of gateway1 (UE1 310) operating as the P2P group owner in the first P2P group 350. In this case, uplink transmission is not possible due to an IP address conflict in the second P2P group 360.

Specifically, in the second P2P group 360, gateway1 (UE1 310) may use 192.168.49.1 which is the IPv4 address of the P2P MAC entity of gateway2 (UE4 340) as a destination address of uplink data to perform Wi-Fi direct communication as a legacy client through the WLAN MAC entity and transmit the uplink data to gateway2 (UE4 340).

In this case, the IPv4 address of the P2P MAC entity of gateway2 (UE4 340) which is the destination address is the same as the IPv4 address of the P2P MAC entity of gateway1 (UE1 310). Therefore, the uplink data (or packet) to be transmitted from gateway1 (UE1 310) to gateway2 (UE4 340) in the second P2P group 360 may not be transmitted to gateway2 (UE4 340) and may be transferred from the WLAN MAC entity of gateway1 (UE1 310) to the P2P MAC entity of gateway1 (UE1 310).

In other words, the packet to be transferred from gateway1 (UE1 310) to gateway2 (UE4 340) is transferred to a group owner hosting local interface of gateway1 (UE1 310) due to the IPv4 address conflict.

That is, in the second P2P group 360, uplink transmission from gateway1 (UE1 310) to gateway2 (UE4 340) cannot be performed. For this reason, due to the problem in which a plurality of P2P group owners are assigned the same IPv4 address, a Wi-Fi direct multi-group network currently has limitations in a bidirectional IPv4/transmission control protocol (TCP) connection.

Figure 4:
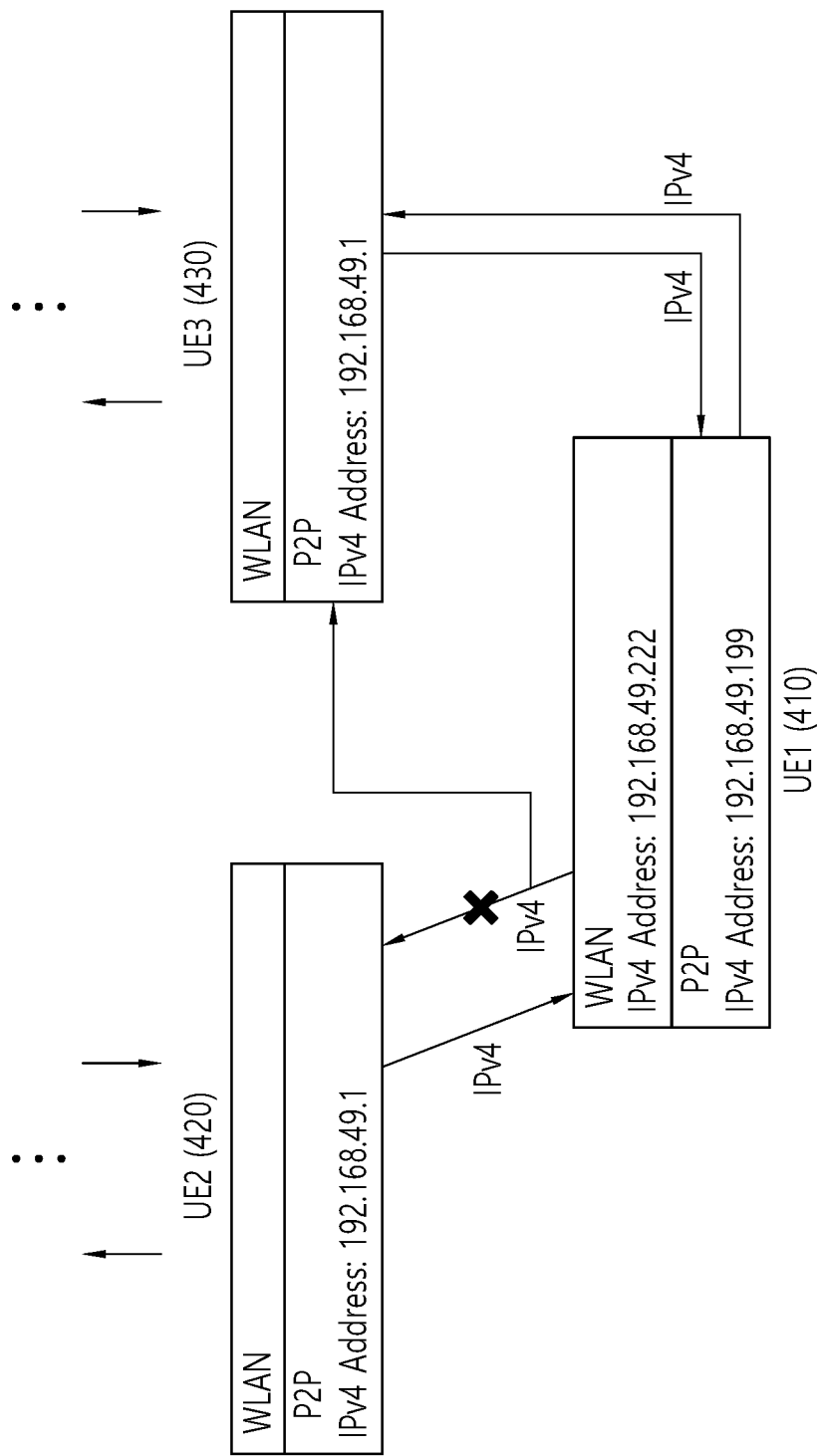
FIG. 4 is a conceptual diagram showing a Wi-Fi direct multi-group network.

FIG. 4 is a conceptual diagram showing a Wi-Fi direct multi-group network.

FIG. 4 discloses a Wi-Fi direct multi-group network including a plurality of P2P groups formed on the basis of UE which operates as a client using both a WLAN MAC entity and a P2P MAC entity.

Referring to FIG. 4, operations of a plurality of different pieces of UE which operate as P2P group owners and one piece of UE which is a combination of a legacy client and a P2P client are disclosed. From now, UE which operates as a legacy client and a P2P client to form each of a plurality of P2P groups with a plurality of different pieces of UE may be expressed by the term "spoke" or "spoke node." A spoke may also be a gateway which connects at least two P2P groups operating in a Wi-Fi direct multi-group network. In other words, the term "gateway" used in the present invention may include a spoke. A gateway which is a spoke may also be separately expressed by the term "spoke gateway."

Specifically, a spoke (UE1 410) (or a gateway (UE1 410)) or a spoke gateway (UE1 410) may perform Wi-Fi direct communication with UE2 420 which operates as a P2P group owner through a WLAN MAC entity as a legacy client. Also, the spoke (UE1 410) may perform Wi-Fi direct communication with UE3 430 which operates as a P2P group owner through a P2P MAC entity as a P2P client.

UE2 420 and UE3 430 may be gateways or non-gateways but are assumed to be gateways for convenience of description.

As described above, gateway1 (UE2 420) and gateway2 (UE3 430) which operate as P2P group owners may be assigned the same IPv4 address (192.168.49.1).

Even in the Wi-Fi direct multi-group network including the spoke (UE1 410), the problem in which the P2P group owners are assigned the same IPv4 address occurs.

When the spoke (UE1 410) transmits uplink data to gateway2 (UE3 430) as a P2P client using the P2P MAC entity, an IPv4 address (192.168.49.1) of gateway2 (UE3 430) may be used as a destination address. Such uplink transmission from the spoke (UE1 410) to gateway2 (UE3 430) based on the P2P MAC entity may be performed normally.

On the other hand, when the spoke (UE1 410) transmits uplink data to gateway1 (UE2 420) as a legacy client using the WLAN MAC entity, an IPv4 address (192.168.49.1) of gateway1 (UE2 420) may be used as a destination address. The IPv4 address (192.168.49.1) of gateway1 (UE2 420) used as the destination address has the same value as the IPv4 address (192.168.49.1) of gateway2 (UE3 430).

The uplink data that the spoke (UE1 410) tries to transmit to gateway1 (UE2 420) through the WLAN MAC entity is transmitted not to gateway1 (UE2 420) but to gateway2 (UE3 430) due to the problem in which the gateway1 (UE2 420) and gateway2 (UE3 430) are assigned the same IPv4 address.

This is because gateway2 (UE3 430) to which the spoke has been coupled as a P2P client through the P2P MAC entity has priority over gateway1 (UE2 420) to which the spoke has been coupled as a legacy client through the WLAN MAC entity in an IP routing table of the spoke.

When the priority order is reversed in the IP routing table of the spoke, uplink data to be transmitted to gateway2 (UE3 430) through the P2P MAC entity may be transmitted not to gateway2 (UE3 430) but to gateway1 (UE2 420) due to the problem in which gateway1 (UE2 420) and gateway2 (UE3 430) are assigned the same IPv4 address.

For this reason, uplink data transmitted by a spoke may be transmitted to one of a plurality of pieces of UE which are gateways or non-gateways connected to the spoke, and transmission of uplink data to other pieces of UE may fail.

A method of solving the problem of uplink transmission at a gateway (including a spoke) caused by an IPv4 address conflict shown in FIGS. 3 and 4 will be disclosed below according to an exemplary embodiment of the present invention.

Figure 5:
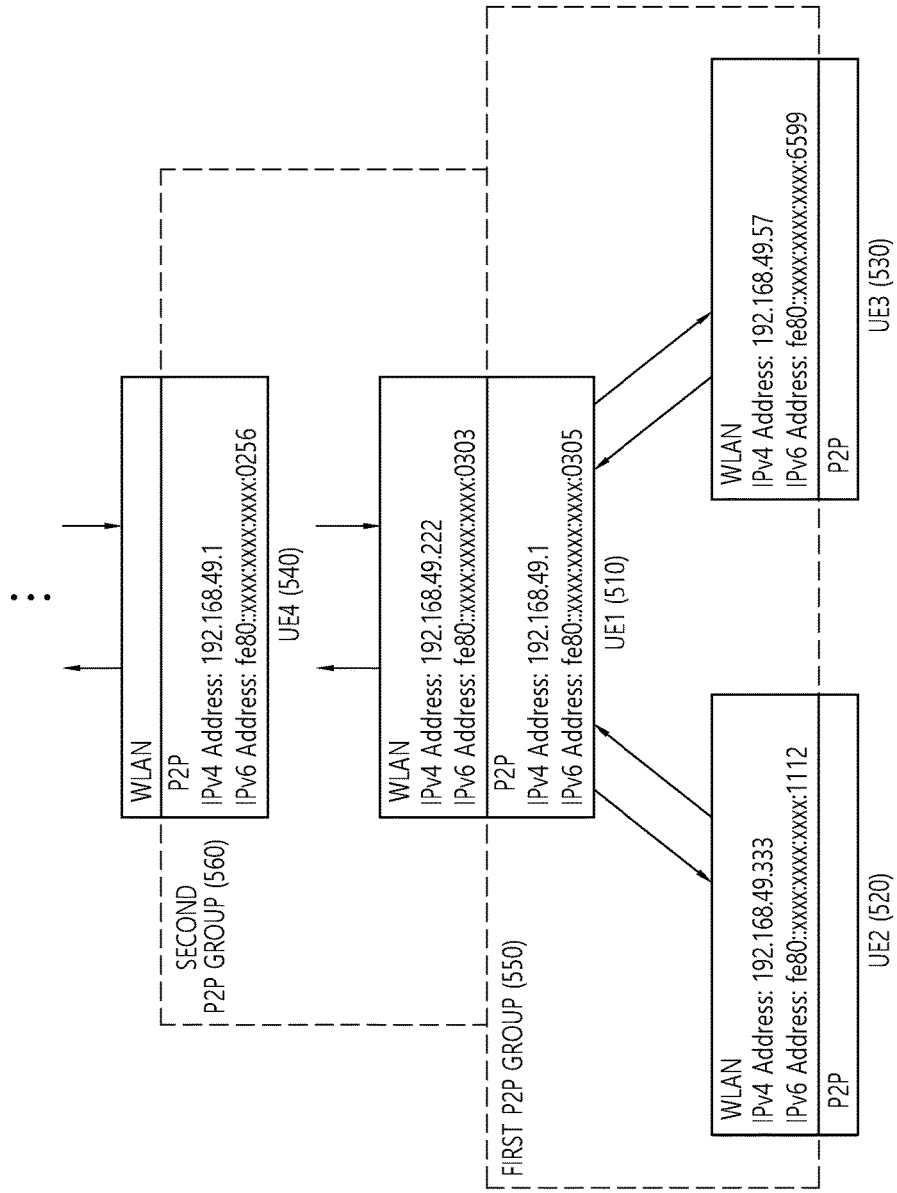
FIG. 5 is a conceptual diagram showing a Wi-Fi direct multi-group network according to an exemplary embodiment of the present invention.

FIG. 5 is a conceptual diagram showing a Wi-Fi direct multi-group network according to an exemplary embodiment of the present invention.

FIG. 5 discloses a Wi-Fi direct multi-group network including a plurality of P2P groups formed on the basis of gateways. According to an exemplary embodiment of the present invention, it is possible to successfully perform uplink transmission in a Wi-Fi direct multi-group network using an IPv6 address. An IPv6 address may be a globally unique value and at least a locally unique value.

An IPv6 address is a link-local address always paired with a MAC address and has a fixed address value which is unique for a network interface on the basis of all MAC entities. As a link-local address, an IPv6 address is a near-globally unique address value paired with a MAC address of hardware which does not require dynamic address assignment. Therefore, it is possible to acquire an IPv6 address without an additional handshake for network reconfiguration as the same time as link-level pairing.

Referring to FIG. 5, the Wi-Fi direct multi-group network may include a first p2P group 550 and a second P2P group 560 connected on the basis of UE1 510 which operates as a gateway.

As described above, the first P2P group 550 may include gateway1 (UE1 510) and non-gateways (UE2 520 and UE3 530). In the first P2P group 550, gateway1 (UE1 510) may communicate with non-gateway1 (UE2 520) and non-gateway2 (UE3 530) as a P2P group owner using a P2P MAC entity on the basis of Wi-Fi direct. An IP address for Wi-Fi direct communication using the P2P MAC entity may be an IPv4 address 192.168.49.1 and an IPv6 address fe80::xxxx:xxxx:xxxx:0305.

As legacy clients, non-gateway1 (UE2 520) and non-gateway2 (UE3 530) may recognize gateway1 (UE1 510) operating as a P2P group owner as an AP and perform Wi-Fi direct communication with gateway1 (UE1 510). Specifically, non-gateway1 (UE2 520) and non-gateway2 (UE3 530) are assigned different IPv4 addresses (192.168.49.333 and 192.168.49.57) from gateway1 (UE1 510) operating as the P2P group owner and perform Wi-Fi direct communication with gateway1 (UE1 510) through WLAN MAC entities using the different IPv4 addresses. Alternatively, non-gateway1 (UE2 520) and non-gateway2 (UE3 530) may perform Wi-Fi direct communication with gateway1 (UE1 510) using IP addresses fe80::xxxx:xxxx:xxxx:1112 and fe80::xxxx:xxxx:xxxx:6599 assigned on the basis of IPv6.

In other words, in the first P2P group 550, non-gateway1 (UE2 520), non-gateway2 (UE3 530), and gateway1 (UE1 510) may communicate using different IPv4 addresses or different IPv6 addresses. Therefore, in the first P2P group 550, uplink transmission and downlink transmission can be performed without the problem of an IP address conflict.

The second P2P group 560 may include gateway1 (UE1 510) and gateway2 (UE4 540). Although it is assumed in FIG. 5 that UE4 540 is a gateway for convenience of description, UE4 540 may be service providing UE which enables access to an infrastructure network. Service providing UE will be described below.

Gateway1 (UE1 510) may operate as a legacy client to perform Wi-Fi direct communication with gateway2 (UE4 540) through a WLAN MAC entity. An IP address of gateway1 (UE1 510) for communication based on the WLAN MAC entity may be an IPv4 address 192.168.49.422 and an IPv6 address fe80::xxxx:xxxx:xxxx:0303.

Gateway2 (UE4 540) may communicate with gateway1 (UE1 510) on the basis of Wi-Fi direct using the P2P MAC entity. An IP address of gateway2 (UE4 540) for communication based on the P2P MAC entity may be the IPv4 address 192.168.49.1 and an IPv6 address fe80::xxxx:xxxx:xxxx:0256.

An IP address of gateway1 (UE1 510) assigned for communication based on the WLAN MAC entity does not have a value conflicting with other IP addresses. Therefore, in the second P2P group 560, downlink transmission can be performed without the problem of an IP address conflict like the above description.

According to an exemplary embodiment of the present invention, to solve the problem of uplink transmission caused by an IP address conflict in the second P2P group 560, gateway1 (UE1 510) may transmit uplink data to gateway2 (UE4 540) using the IPv6 address of gateway2 (UE4 540).

The IPv6 address of gateway2 (UE4 540) is a unique value. Therefore, when the IPv6 address of gateway2 (UE4 540) is used, transmission of uplink data from gateway1 (UE1 510) to gateway2 (UE4 540) may succeed in the second P2P group 560 without the problem of an IP address conflict. In other words, unlike the related art, uplink data to be transferred from gateway1 (UE1 510) to gateway2 (UE4 540) is not transferred to a group owner hosting local interface of gateway1 (UE1 510).

A Wi-Fi direct multi-group network can be extended using such an IPv6 address, and uplink transmission and downlink transmission can be performed via the Wi-Fi direct multi-group network.

Figure 6:
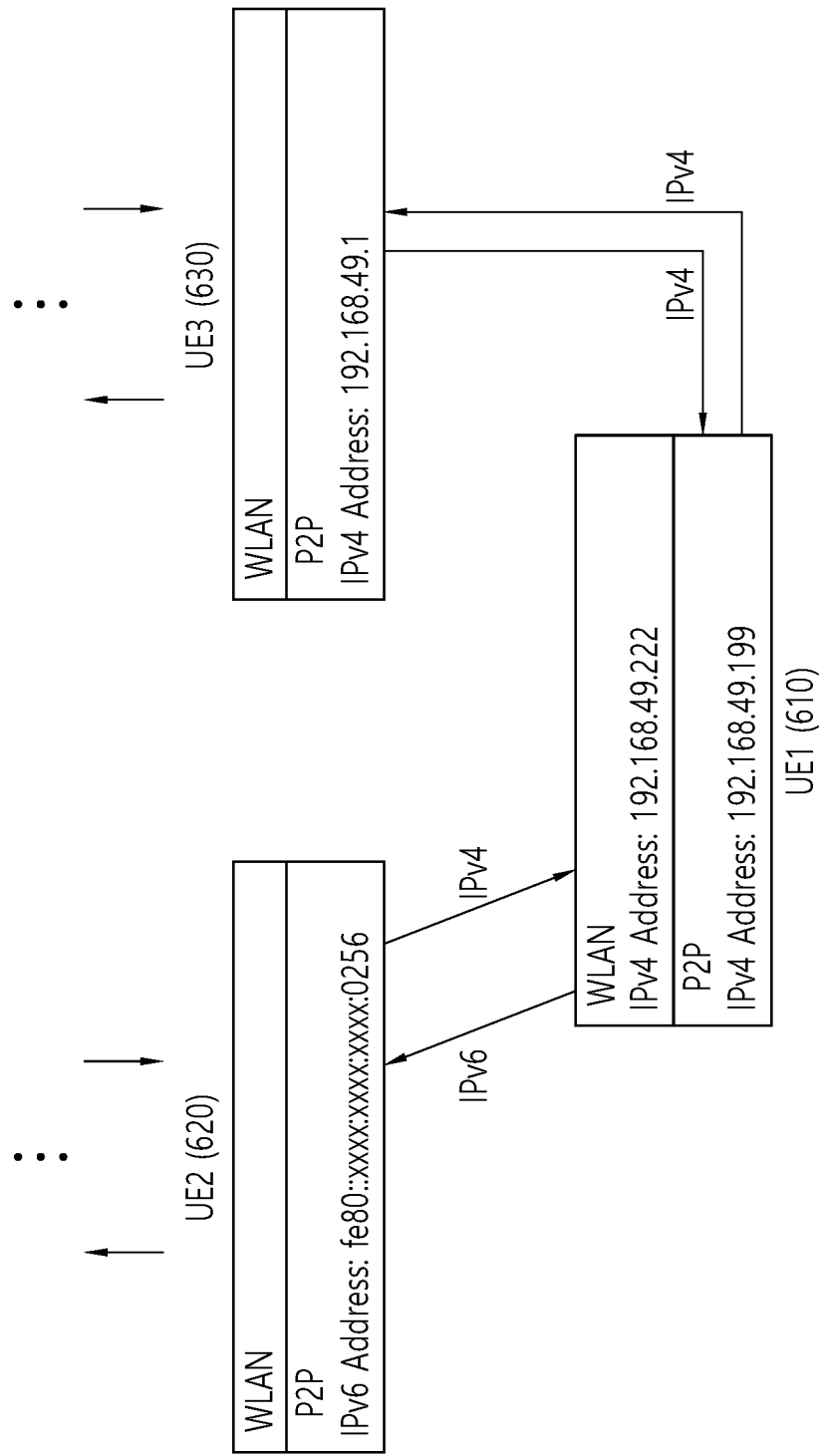
FIG. 6 is a conceptual diagram showing a Wi-Fi direct multi-group network according to an exemplary embodiment of the present invention.

FIG. 6 is a conceptual diagram showing a Wi-Fi direct multi-group network according to an exemplary embodiment of the present invention.

FIG. 6 discloses a Wi-Fi direct multi-group network including a plurality of P2P groups formed on the basis of a spoke which operates as a legacy client and a P2P client using both a WLAN MAC entity and a P2P MAC entity.

As described above, a spoke may be UE which operates as a legacy client and a P2P client to form each of a plurality of P2P groups with a plurality of different pieces of UE. A spoke may also be a gateway which connects at least two P2P groups operating in a Wi-Fi direct multi-group network. A spoke (UE1 610) shown in FIG. 6 may be interpreted as a gateway (UE1 610) and a spoke gateway (UE1 610) in other expressions.

The spoke (UE1 610) may serve to transmit uplink data in a distributed manner in the Wi-Fi direct multi-group network and relay uplink data or downlink data between pieces of UE.

For convenience of description, UE2 620 and UE3 630 are assumed to be gateways, but UE2 620 and/or UE3 630 may be a non-gateway or service providing UE.

Referring to FIG. 6, as a legacy client, the spoke (UE1 610) may communicate with gateway1 (UE2 620) operating as a P2P group owner through a WLAN MAC entity on the basis of Wi-Fi direct. Also, as a P2P client, the spoke (UE1 610) may communicate with gateway2 (UE3 630) operating as a P2P group owner through a P2P MAC entity on the basis of Wi-Fi direct.

According to an exemplary embodiment of the present invention, Wi-Fi direct communication between the spoke and at least one of gateway1 (UE2 620) and gateway2 (UE3 630) operating as P2P group owners may be performed using an IPv6 address.

Specifically, gateway1 (UE2 620) may communicate with the spoke (UE1 610) using an IPv6 address, and gateway2 (UE3 630) may communicate with the spoke (UE1 610) using an IPv4 address.

Specifically, according to an exemplary embodiment of the present invention, the spoke (UE1 610) may transmit uplink data to at least one of gateway1 (UE2 620) and gateway2 (UE3 630) operating as P2P group owners through Wi-Fi direct communication in which an IPv6 address is used. The spoke (UE1 610) may transmit uplink data to gateway1 (UE2 620) using an IPv6 address and transmit uplink data to gateway2 (UE3 630) using an IPv4 address.

When the spoke (UE1 610) transmits uplink data to gateway2 (UE3 630) as a P2P client using the P2P MAC entity, an IPv4 address (192.168.49.1) of gateway2 (UE3 630) may be used as a destination address. Also, when the spoke (UE1 610) transmits uplink data to gateway1 (UE2 620) as a legacy client using the WLAN MAC entity, an IPv6 address (fe80::xxxx:xxxx:xxxx:0256) of gateway1 (UE2 620) may be used as a destination address. Since the IPv6 address (fe80::xxxx:xxxx:xxxx:0256) is a unique address of gateway1 (UE2 620), uplink transmission from the spoke (UE1 610) may not fail.

Even when the spoke (UE1 610) transmits uplink data to gateway2 (UE3 630) as a P2P client using the P2P MAC entity, an IPv6 address of gateway2 (UE3 630) may be used.

In other words, referring to FIGS. 5 and 6, uplink transmission of a gateway (including a spoke) may be performed using an IPv6 address to avoid an IP address conflict.

IPv6 addresses shown in FIGS. 5 and 6 may be unique identifiers for gateways. A unique identifier of a type other than an IPv6 address may be used for uplink transmission of a gateway.

According to another exemplary embodiment of the present invention, as another method for avoid an IP address conflict in a Wi-Fi direct multi-group network, user datagram protocol (UDT)-based broadcast or multicast may be used. Since UDP-based broadcast or multicast is not unicast based on an IP address, uplink transmission of a gateway may be successfully performed.

Figure 7:
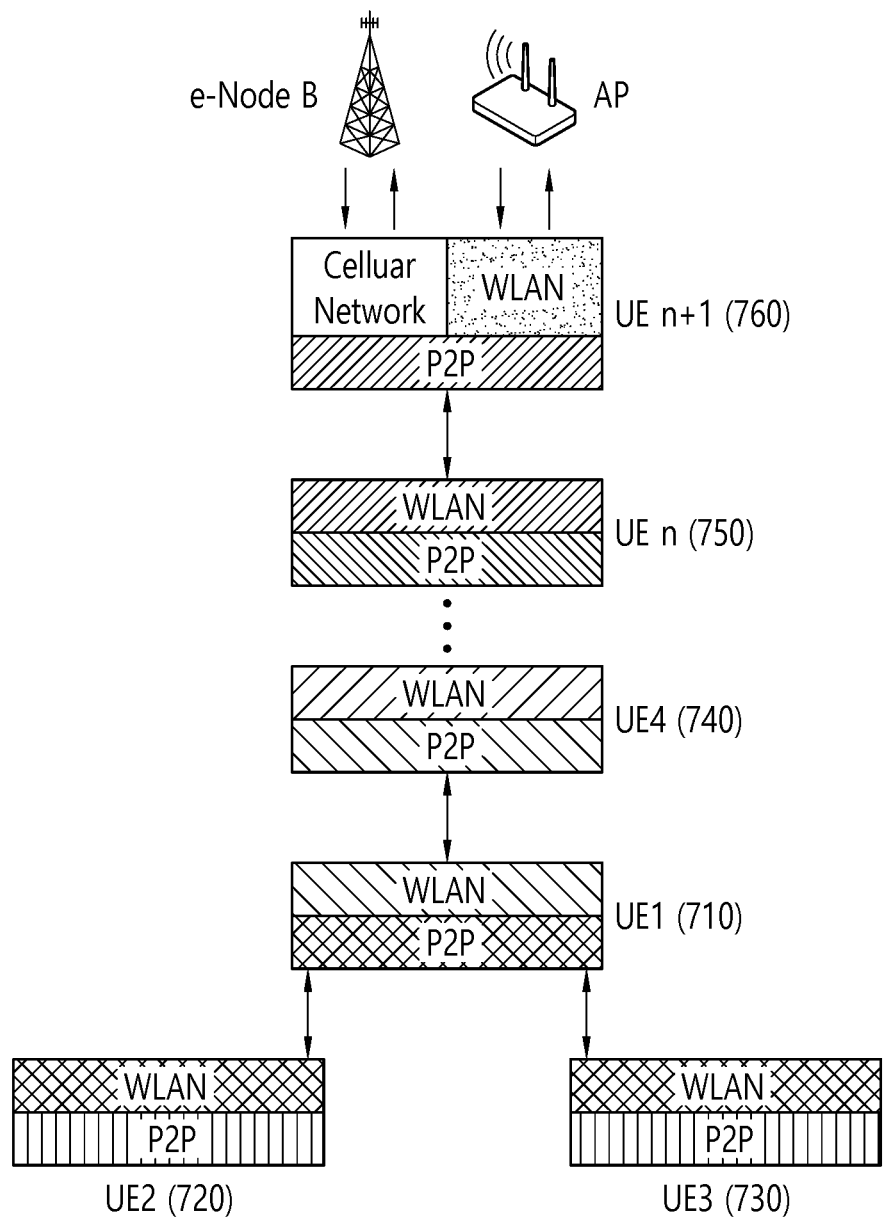
FIG. 7 is a conceptual diagram showing a method of providing a communication service on the basis of a Wi-Fi direct multi-group network according to an exemplary embodiment of the present invention.

FIG. 7 is a conceptual diagram showing a method of providing a communication service on the basis of a Wi-Fi direct multi-group network according to an exemplary embodiment of the present invention.

FIG. 7 discloses a method in which a gateway or a non-gateway placed in a Wi-Fi direct multi-group network operates as service requesting UE to indirectly access an infrastructure network, such as a WLAN or a cellular network, on the basis of the Wi-Fi direct multi-group network.

According to an exemplary embodiment of the present invention, a service for providing indirect access to an infrastructure network on the basis of a Wi-Fi direct multi-group network (referred to as a Wi-Fi direct multi-group network service below) may be provided. A Wi-Fi direct multi-group network may further include service providing UE for the Wi-Fi direct multi-group network service.

In other words, a Wi-Fi direct multi-group network for the Wi-Fi direct multi-group network service may include a gateway or a non-gateway which can operate as service requesting UE and service providing UE.

The service requesting UE may be UE which requests indirect access to an infrastructure network. The non-gateway or the gateway (including a spoke) may be the service requesting UE. The service requesting UE may indirectly access the infrastructure network through the service providing UE.

The service providing UE may be UE which is coupled to the service requesting UE on the basis of Wi-Fi direct and coupled to a network infrastructure (e.g., an AP or an e-Node B) or the like to enable the service requesting UE to indirectly access the infrastructure network.

FIG. 7 shows a Wi-Fi direct multi-group network in which at least one gateway is used as an example. The Wi-Fi direct multi-group network may include a non-gateway, a gateway, and service providing UE.

In an exemplary embodiment of the present invention, there are a plurality of gateways for convenience of description. However, only one gateway may be in a Wi-Fi direct multi-group network and connected to service providing UE connected to an infrastructure network.

Referring to FIG. 7, the Wi-Fi direct multi-group network may include a first P2P group, a second P2P group, a third P2P group, etc. like the above description of FIG. 5.

As described above, non-gateway1 (UE2 720) and non-gateway2 (UE3 730) included in the first P2P group are legacy clients and may recognize gateway1 (UE1 710), which operates as a P2P group owner, as an AP and communicate with gateway1 (UE1 710) on the basis of Wi-Fi direct. In case of necessity, non-gateway1 (UE2 720) and/or non-gateway2 (UE3 730) may not directly access the infrastructure network (e.g., the cellular network or the WLAN network) as service requesting UE and may indirectly access the infrastructure network through gateway1 (UE1 710) as legacy clients. Here, gateway1 (UE1 710) may transfer uplink data transmitted by non-gateway1 (UE2 720) and/or non-gateway2 (UE3 730) to a network infrastructure through other gateways (e.g., UE4 740 and UEn 750) and service providing UE (e.g., UEn+1 760). Also, gateway1 (UE1 710) may transfer downlink data, which is transmitted from the network infrastructure to non-gateway1 (UE2 720) and/or non-gateway2 (UE3 730) through other gateways (e.g., UE4 740 and UEn 750) and the service providing UE (UEn+1 760), to non-gateway1 (UE2 720) and/or non-gateway2 (UE3 730).

The second P2P group may include gateway1 (UE1 710) operating as a legacy client and gateway2 (UE4 740) operating as a P2P group owner. As described above, the Wi-Fi direct multi-group network may have an extended structure through gateway-based connections.

Gateway1 (UE1 710) and gateway2 (UE4 740) may serve to transfer uplink data/downlink data generated in indirect communication between other service requesting UE and a network infrastructure. Also, gateway1 (UE1 710) and/or gateway2 (UE4 740) may operate as service requesting UE. For example, gateway1 (UE1 710) may operate as service requesting UE to indirectly access the infrastructure network through gateway2 (UE4 740).

The third P2P group may include gatewayn (UEn 750) operating as a legacy client and the service providing UE (UEn+1 760) operating as a P2P group owner. The service providing UE (UEn+1 760) may directly access the AP based on the WLAN or a base station (e.g., the e-Node B) based on the cellular network. The service providing UE (UEn+1 760) may directly access the cellular network through a cellular network interface or directly access the WLAN through a WLAN interface.

Gatewayn (UEn 750) may also operate as service requesting UE or serve to transfer uplink/downlink data for indirect communication between other service requesting UE and the service providing UE (UEn+1 760).

Figure 8:
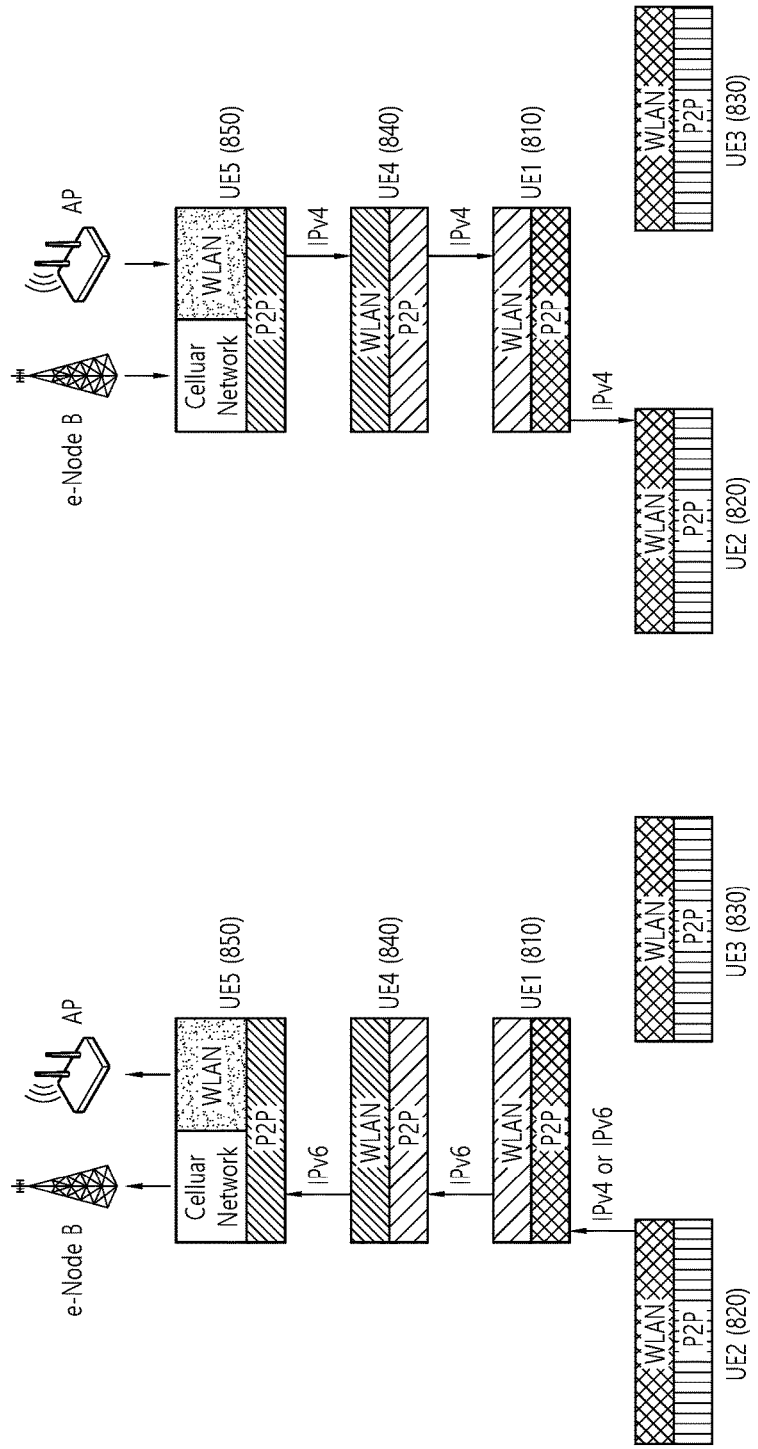
FIG. 8 is a conceptual diagram showing uplink transmission and downlink transmission in a Wi-Fi direct multi-group network according to an exemplary embodiment of the present invention.

FIG. 8 is a conceptual diagram showing uplink transmission and downlink transmission in a Wi-Fi direct multi-group network according to an exemplary embodiment of the present invention.

FIG. 8 shows uplink transmission from service requesting UE and downlink transmission to service requesting UE in detail. For convenience of description, it is assumed that a non-gateway (UE 820) is service requesting UE. Likewise, a gateway (e.g., UE 810) may also operate as service requesting UE.

Uplink transmission of service requesting UE is shown on the left side of FIG. 8.

Referring to the left side of FIG. 8, non-gateway1 (UE2 820) may transmit uplink data wanted to be transmitted to an infrastructure network to gateway1 (UE1 810) using an IPv4 address or an IPv6 address of gateway1 (UE1 810) on the basis of Wi-Fi direct communication.

As described above with reference to FIG. 5, to avoid an IP address conflict, gateway1 (UE1 810) may transfer the uplink data received from non-gateway1 (UE2 820) to gateway2 (UE4 840) using an IPv6 address of gateway2 (UE4 840) through Wi-Fi direct communication.

Gateway2 (UE4 840) may transfer the uplink data received from gateway1 (UE1 810) to service providing UE (UE5 850) using an IPv6 address of the service providing UE (UE5 850) through Wi-Fi direct communication. The service providing UE (UE5 850) may transfer the received uplink data to the infrastructure network through a network infrastructure (e.g., an AP or an e-Node B).

On the basis of such uplink transmission in a Wi-Fi direct multi-group network, service requesting UE may indirectly transmit uplink data to an infrastructure network.

Downlink transmission from a network infrastructure to service requesting UE is shown on the right side of FIG. 8.

Referring to the right side of FIG. 8, the service providing UE (UE5 850) may receive downlink data to be transmitted to non-gateway1 (UE2 820) operating as service requesting UE via the infrastructure network. The service providing UE (UE5 850) may transmit the downlink data received from the infrastructure network to gateway2 (UE4 840) using an IPv4 address of gateway2 (UE4 840). Gateway2 (UE4 840) may transmit the downlink data received from the service providing UE (UE5 850) to gateway1 (UE1 810) using the IPv4 address of gateway1 (UE1 810). Gateway1 (UE1 810) may transmit the downlink data received from gateway2 (UE4 840) to non-gateway1 (UE2 820) using an IPv4 address of non-gateway1 (UE2 820) operating as service requesting UE. The downlink transmission shown on the right side of FIG. 8 may be performed using IPv6 addresses instead of IPv4 addresses.

On the basis of such downlink transmission in a Wi-Fi direct multi-group network, service requesting UE may indirectly receive downlink data from an infrastructure network.

Using such uplink transmission and downlink transmission in a Wi-Fi direct multi-group network, service requesting UE may receive a service that can be provided on the basis of a network infrastructure without directly accessing the network infrastructure.

Therefore, it is possible to solve a problem caused by a depletion of wireless resources following an increase in demand for mobile network traffic and relieve the burden of telecommunication expenses following an increase in the amount of mobile network traffic used by a user.

Figure 9:
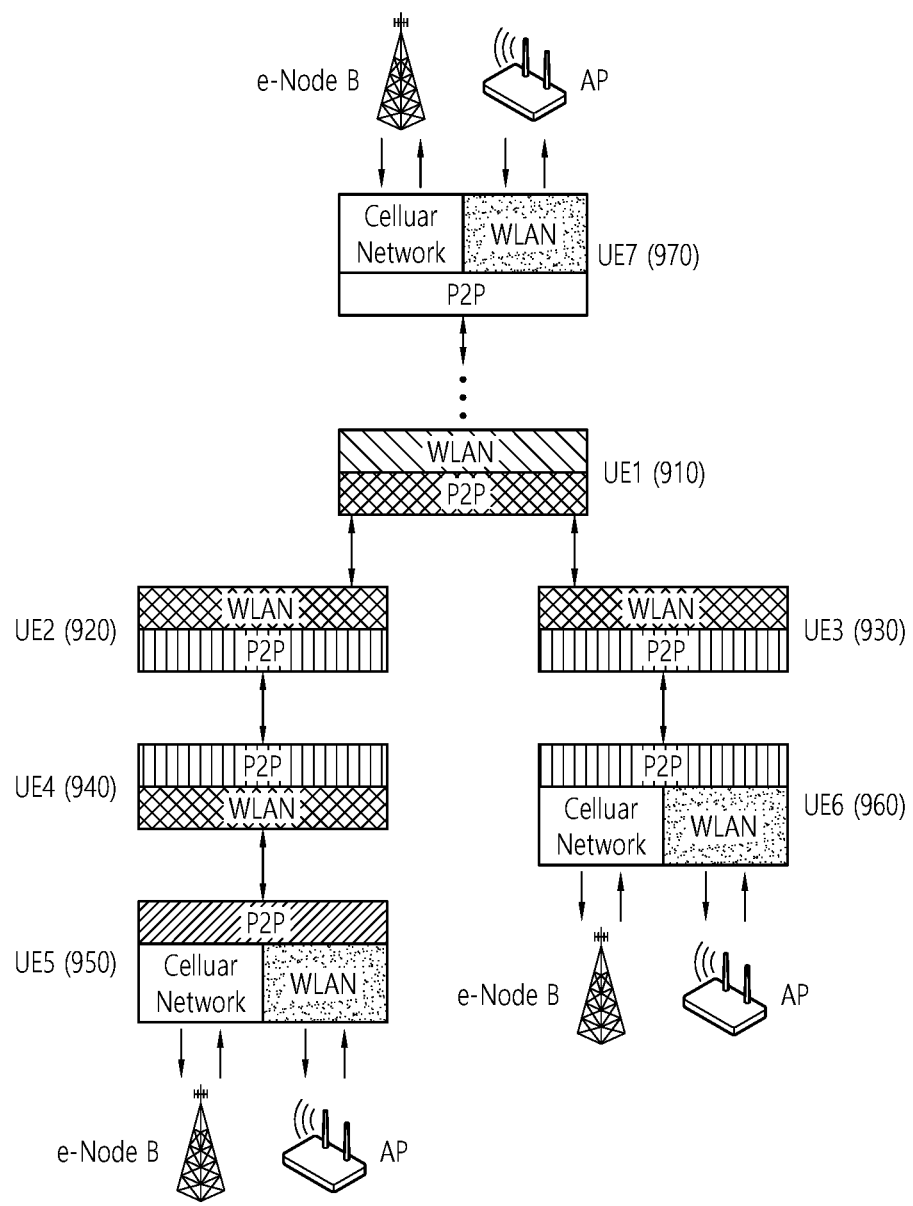
FIG. 9 is a conceptual diagram of a communication service provided on the basis of a Wi-Fi direct multi-group network according to an exemplary embodiment of the present invention.

FIG. 9 is a conceptual diagram of a communication service provided on the basis of a Wi-Fi direct multi-group network according to an exemplary embodiment of the present invention.

FIG. 9 shows Wi-Fi direct communication on the basis of a spoke in a Wi-Fi direct multi-group network.

As described above, the spoke may be UE which operates as a legacy client and a P2P client to form each of a plurality of P2P groups with a plurality of different pieces of UE. The spoke may also be a gateway which connects at least two P2P groups operating in the Wi-Fi direct multi-group network. The spoke may also be interpreted as a gateway and a spoke gateway in other expressions.

Referring to FIG. 9, first, it is assumed that spoke1 (UE2 920) operates as service requesting UE.

Spoke1 (UE2 920) may be coupled to each of gateway1 (UE1 910) and gateway2 (UE4 940) as service requesting UE on the basis of Wi-Fi direct. Specifically, spoke1 (UE2 920) may be coupled to gateway1 (UE1 910) as a legacy client using a WLAN MAC entity and may be coupled to gateway2 (UE4 940) as a P2P client using a P2P MAC entity.

As service requesting UE, spoke1 (UE2 920) may indirectly access an infrastructure network through gateway2 (UE4 940) and service providing UE1 (UE5 950) or indirectly access an infrastructure network through gateway1 (UE1 910) and service providing UE2 (UE7 970). As described above, when performing uplink transmission through gateway1 (UE1 910) and/or gateway2 (UE4 940), the spoke may use IPv6 addresses of gateway1 (UE1 910) and/or gateway2 (UE4 940).

Also, spoke1 (UE2 920) may serve to transfer (or relay) data transmitted from other service requesting UE. As an example, when gateway1 (UE1 910) operates as service requesting UE, gateway1 (UE1 910) may downlink data to spoke1 (UE2 920) as a P2P group owner to indirectly access the infrastructure network through service providing UE1 (UE5 950). Spoke1 (UE2 920) may uplink the received data to gateway2 (UE4 940). Here, the uplink transmission to gateway2 (UE4 940) may be performed using an IPv6 address (or an IPv4 address) of gateway2 (UE4 940).

As another example, when gateway2 (UE4 940) operates as service requesting UE, gateway2 (UE4 940) may downlink data to spoke1 (UE2 920) as a P2P group owner to indirectly access the infrastructure network through service providing UE2 (UE7 970). Spoke1 (UE2 920) may uplink the received data to gateway1 (UE1 910). Here, the uplink transmission to gateway1 (UE1 910) may be performed using an IPv6 address of gateway1 (UE1 910) to avoid an IP address conflict.

In other words, uplink transmission of a spoke included in a gateway may be performed using an IPv6 address.

Figure 10:
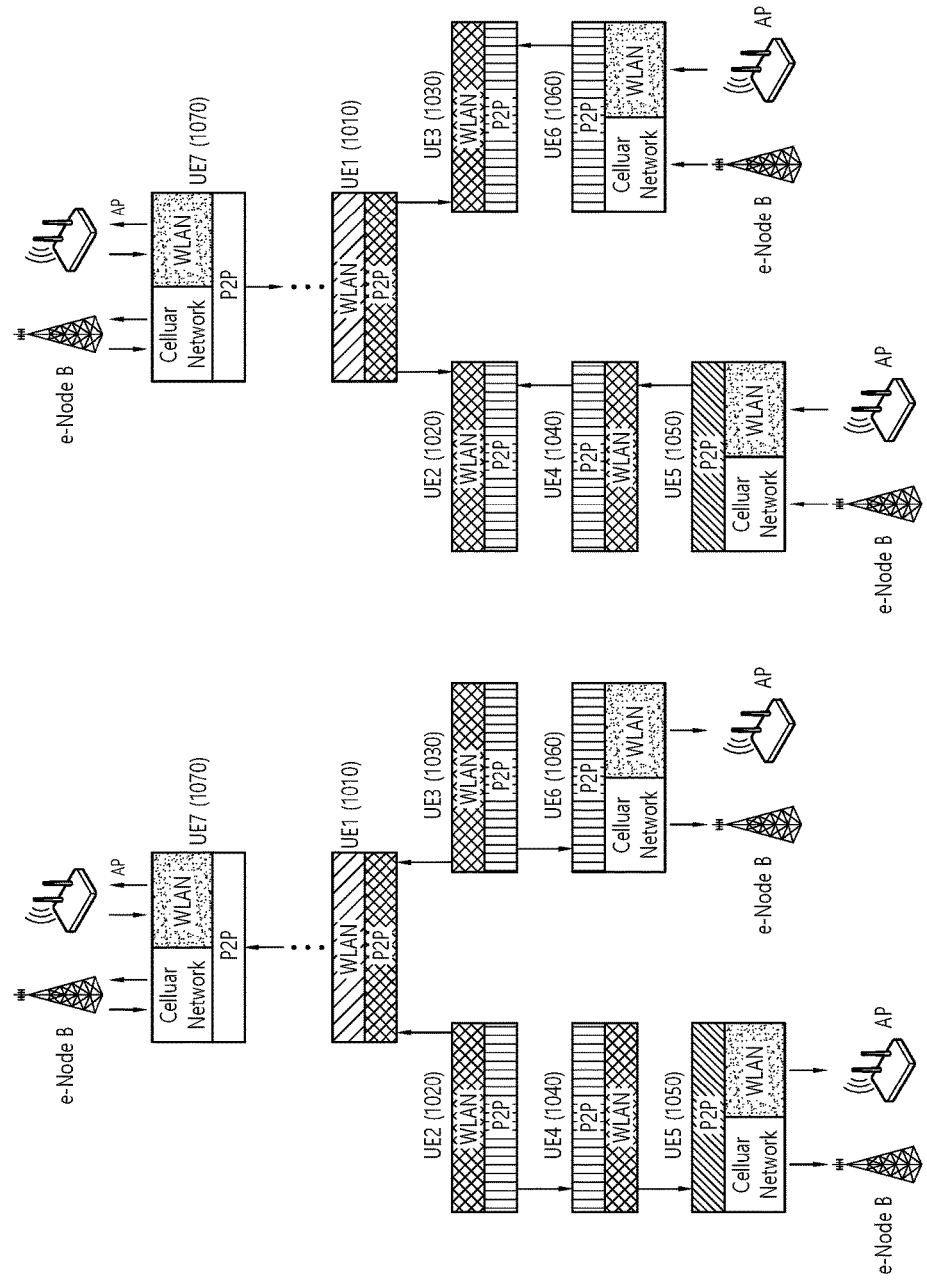
FIG. 10 is a conceptual diagram showing uplink transmission and downlink transmission in a Wi-Fi direct multi-group network according to an exemplary embodiment of the present invention.

FIG. 10 is a conceptual diagram showing uplink transmission and downlink transmission in a Wi-Fi direct multi-group network according to an exemplary embodiment of the present invention.

FIG. 10 shows uplink transmission to a spoke and downlink transmission to the spoke when the spoke is service requesting UE.

Uplink transmission of a spoke operating as service requesting UE is shown on the left side of FIG. 10.

Referring to the left side of FIG. 10, a spoke (UE2 1020) operating as service requesting UE is a legacy client of gateway1 (UE1 1010) and may transmit uplink data to gateway1 (UE1 1010) using an IPv6 address of gateway1 (UE1 1010).

Uplink transmission from gateway1 (UE1 1010) to service providing UE2 (UE7 1070) directly/indirectly connected to gateway1 (UE1 1010) is the same as described above with reference to FIGS. 7 and 8.

Also, the spoke (UE2 1020) operating as service requesting UE may transmit uplink data to gateway2 (UE4 1040) as a P2P client using an IPv4 address (or an IPv6 address) of gateway2 (UE4 1040).

Gateway2 (UE4 1040) may transmit the uplink data received from the spoke (UE2 1020) to service providing UE1 (UE5 1050) using an IPv6 address of service providing UE1 (UE5 1050) to avoid an IP address conflict. Service providing UE1 (UE5 1050) may transfer the received uplink data to an infrastructure network through a network infrastructure (e.g., an AP or an e-Node B).

Downlink transmission to a spoke operating as service requesting UE is shown on the right side of FIG. 10.

Referring to the right side of FIG. 10, service providing UE1 (UE5 1050) may receive downlink data to be transmitted to the spoke (UE2 1020) operating as service requesting UE via the infrastructure network.

Service providing UE1 (UE5 1050) may transmit the downlink data received from the infrastructure network to gateway2 (UE4 1040) using an IPv4 address of gateway2 (UE4 1040). Gateway2 (UE4 1040) may transmit the downlink data received from service providing UE1 (UE5 1050) to the spoke (UE2 1020) using an IPv4 address of the spoke (UE2 1020).

The downlink transmission shown on the right side of FIG. 10 may be performed using IPv6 addresses instead of IPv4 addresses.

Using such uplink transmission and downlink transmission in a Wi-Fi direct multi-group network, service requesting UE may receive a service that can be provided on the basis of a network infrastructure without directly accessing the network infrastructure.

Figure 11:
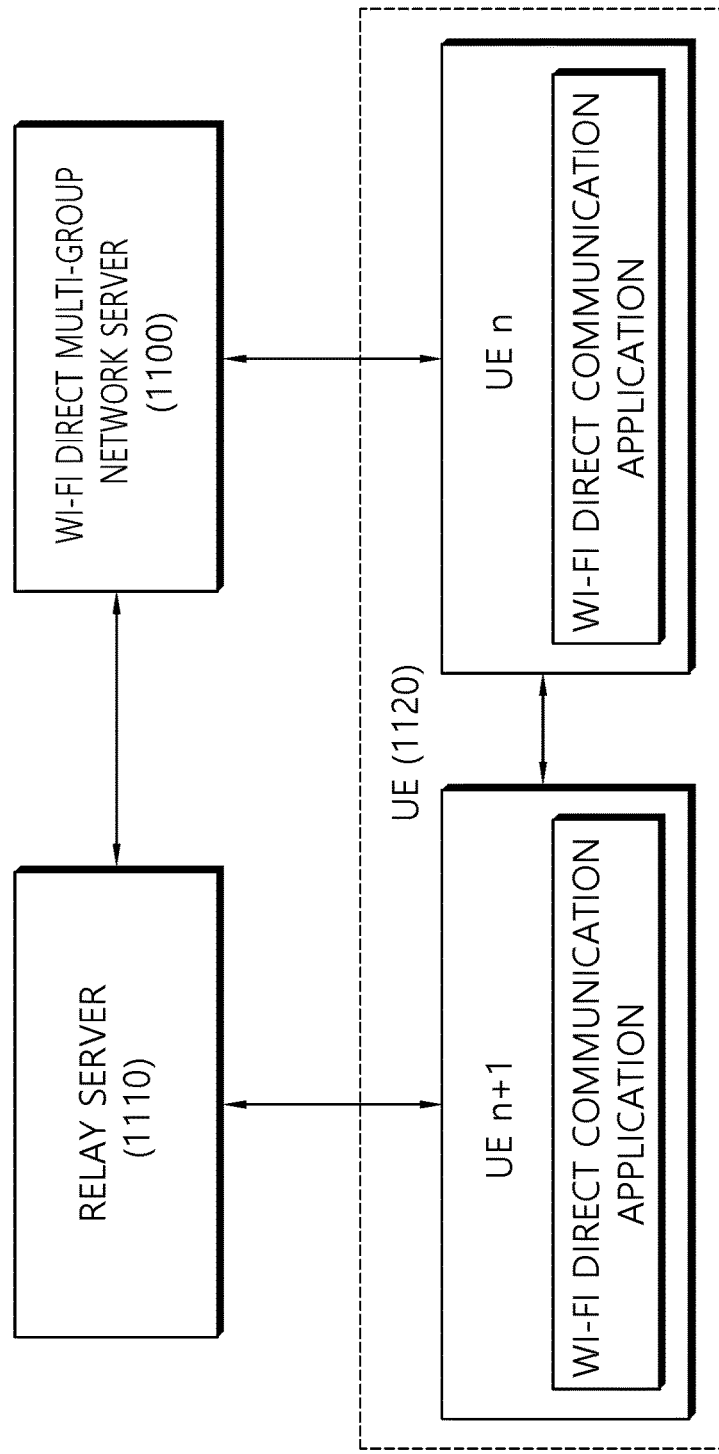
FIG. 11 is a conceptual diagram showing an operation setting of UE which operates in a Wi-Fi direct multi-group network according to an exemplary embodiment of the present invention.

FIG. 11 is a conceptual diagram showing an operation setting of UE which operates in a Wi-Fi direct multi-group network according to an exemplary embodiment of the present invention.

FIG. 11 shows a setting operation of UE for a Wi-Fi direct multi-group network service according to an exemplary embodiment of the present invention. A Wi-Fi direct multi-group communication service may be a service which provides indirect access to a network infrastructure.

Referring to FIG. 11, a plurality of pieces of UE may receive a Wi-Fi direct communication application for the Wi-Fi direct multi-group communication service from a Wi-Fi direct multi-group network server 1100. Alternatively, the plurality of pieces of UE may receive the Wi-Fi direct communication application for the Wi-Fi direct multi-group communication service through a relay server (e.g., a server which relays downloading of an application) 1110 between the Wi-Fi direct multi-group network server 1100 and the plurality of pieces of UE.

Specifically, the Wi-Fi direct multi-group network server 1100 for communication in a Wi-Fi direct multi-group network may include a communicator (or communication unit) for communicating with the relay server 1110 or UE 1120 and a processor operatively connected to the communicator.

The processor may be implemented to receive a request for transmission of the Wi-Fi direct communication application for the Wi-Fi direct multi-group communication service directly or indirectly from UE through the relay server 1110 and to transmit the Wi-Fi direct communication application directly or indirectly to the UE 1120 through the relay server 1110. The Wi-Fi direct multi-group network may be formed on the basis of at least one P2P group which performs direct inter-terminal communication on the basis of Wi-Fi direct, and the Wi-Fi direct communication application may determine destination address information (e.g., an IPv6 address or an IPv4 address) of the UE 1120 for communication in the Wi-Fi direct multi-group network.

A plurality of pieces of UE 1120 may perform the operations for communication in a Wi-Fi direct multi-group network described above with reference to FIGS. 5 to 10 on the basis of the Wi-Fi direct communication application.

Specifically, UE*n* in which the Wi-Fi direct communication application is installed may form a Wi-Fi direct multi-group network in combination with UE*n*+1 in which the Wi-Fi direct communication application is installed.

The UE 1120 in which the Wi-Fi direct communication application is installed may perform operations according to roles in the Wi-Fi direct multi-group network. The roles in the Wi-Fi direct multi-group network may be at least one of a non-gateway, a gateway, and service providing UE. The UE 1120 may determine whether to use an IPv4 address or an IPv6 address for uplink transmission and/or downlink transmission according to a role of the UE 1120 on the basis of the Wi-Fi direct communication application.

For example, when the UE 1120 tries to indirectly transmit and/or receive data via an infrastructure network, the UE 1120 may be connected to the Wi-Fi direct multi-group network on the basis of the Wi-Fi direct communication application as a non-gateway and a gateway and perform operations as service requesting UE.

Alternatively, the UE 1120 may operate as service providing UE on the basis of the Wi-Fi direct communication application to support indirect access of a non-gateway and a gateway operating as service requesting UE to the infrastructure network.

Figure 12:
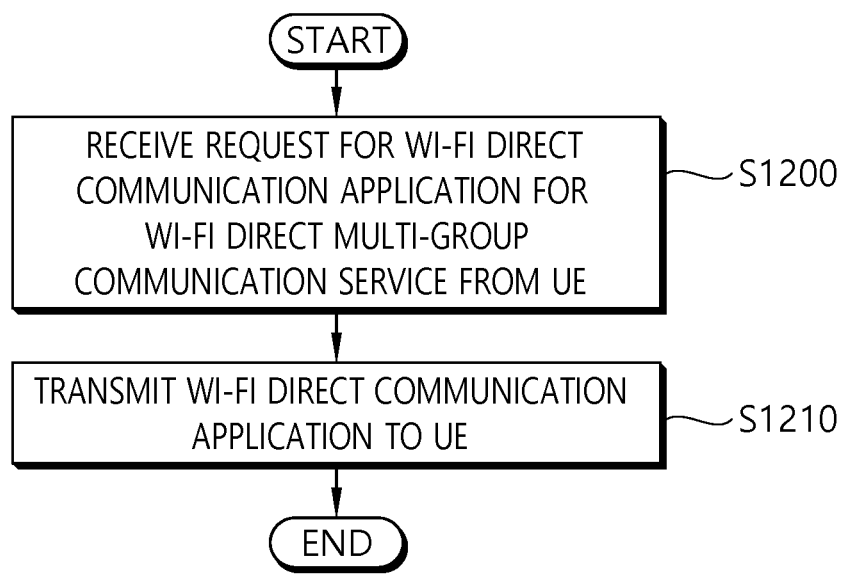
FIG. 12 is a flowchart showing a communication method in a Wi-Fi direct multi-group network according to an exemplary embodiment of the present invention.

FIG. 12 is a flowchart showing a communication method in a Wi-Fi direct multi-group network according to an exemplary embodiment of the present invention.

FIG. 12 shows transmission of a Wi-Fi direct communication application from a Wi-Fi direct multi-group network server to UE and an operation of the UE in which the Wi-Fi direct communication application is installed.

Referring to FIG. 12, a Wi-Fi direct multi-group network server receives a request for transmission of a Wi-Fi direct communication application for the Wi-Fi direct multi-group communication service from UE directly or through a relay server (operation S1200).

The Wi-Fi direct multi-group network server transmits the Wi-Fi direct communication application to the UE directly or through the relay server (operation S1210).

As described above, a Wi-Fi direct multi-group network may be formed on the basis of at least one P2P group which performs direct inter-terminal communication on the basis of Wi-Fi direct.

The Wi-Fi direct communication application may determine destination address information of the UE for communication in the Wi-Fi direct multi-group network.

When the UE performs uplink transmission to other UE in the Wi-Fi direct multi-group network, the Wi-Fi direct communication application may set destination address information to an IPv6 address of the other UE on the basis of a role of the UE in the Wi-Fi direct multi-group network.

Specifically, when the UE operates as a gateway in the Wi-Fi direct multi-group network and performs uplink transmission to other UE in the Wi-Fi direct multi-group network, the Wi-Fi direct communication application may set destination address information to an IPv6 address of the other UE. The UE operating as a gateway may be coupled to other UE on the basis of a plurality of MAC entities in the Wi-Fi direct multi-group network and provide connectivity between at least two P2P groups.

Also, when the UE operates as a gateway in the Wi-Fi direct multi-group network, the UE may be coupled to at least one piece of first other UE as a P2P group owner on the basis of a P2P MAC entity and may be coupled to second other UE as a legacy client on the basis of a WLAN MAC entity. Here, the Wi-Fi direct communication application may set destination address information for uplink transmission from the UE to the second other UE to an IPv6 address of the second other UE.

When the UE operates as a gateway in the Wi-Fi direct multi-group network, the UE may be coupled to first other UE as a P2P client on the basis of the P2P MAC entity and may be coupled to second other UE as a legacy client on the basis of the WLAN MAC entity. Here, the Wi-Fi direct communication application may set destination address information for uplink transmission from the UE to the second other UE to an IPv6 address of the second other UE.

Figure 13:
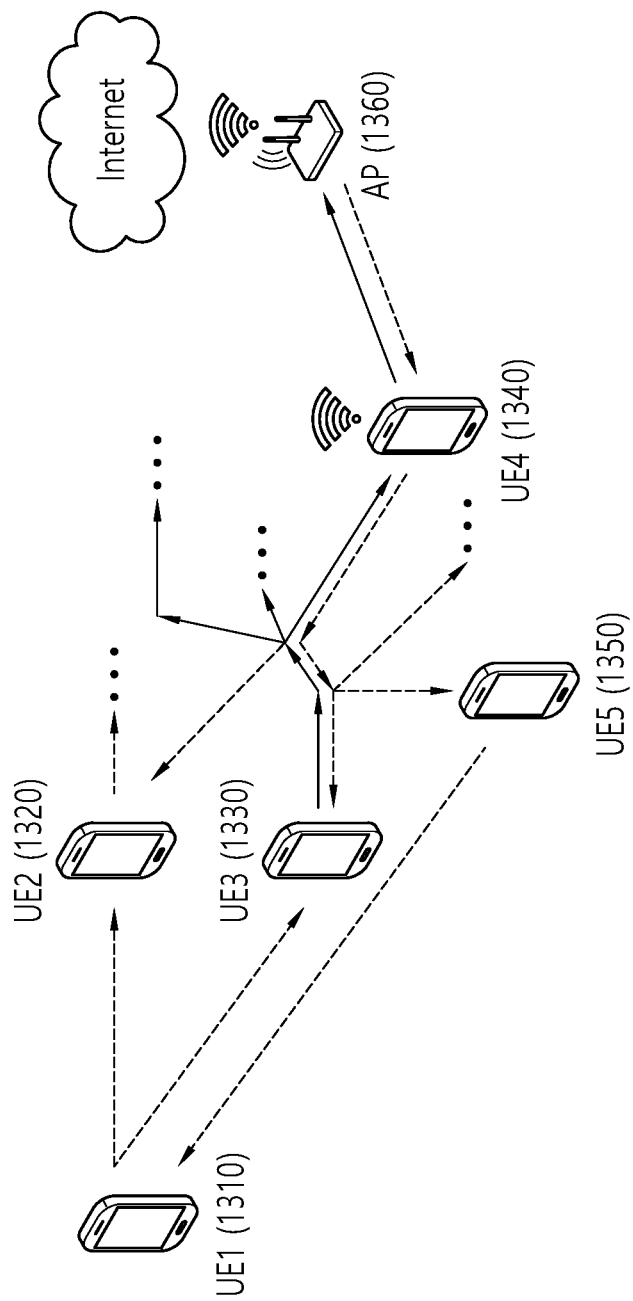
FIG. 13 is a conceptual diagram showing operations of UE in a Wi-Fi direct multi-group network according to an exemplary embodiment of the present invention.

FIG. 13 is a conceptual diagram showing operations of UE in a Wi-Fi direct multi-group network according to an exemplary embodiment of the present invention.

In FIG. 13, it is assumed that UE operating as service requesting UE tries to access a specific webpage.

Referring to FIG. 13, UE1 1310 operating as service requesting UE may generate uplink data for requesting data of a specific webpage (e.g., www.google.com) via a Wi-Fi direct multi-group network. UE1 1310 may be a gateway or a non-gateway.

Specifically, UE1 1310 in which a Wi-Fi direct communication application is installed may determine whether to indirectly access an infrastructure network via the Wi-Fi direct multi-group network or directly access the infrastructure network without using the Wi-Fi direct multi-group network.

When UE1 1310 directly accesses the infrastructure network without using the Wi-Fi direct multi-group network, UE1 1310 may perform an existing operation of accessing an infrastructure network (e.g., an initial access procedure to an AP or an e-Node B).

On the other hand, when UE1 1310 indirectly accesses the infrastructure network using the Wi-Fi direct multi-group network, UE1 1310 may search for other UE which is near UE1 1310 and supports Wi-Fi direct communication, and may perform a procedure for forming a P2P group with at least one piece of found other UE (UE2 1320 and UE3 1330).

UE1 1310 may search for other UE in various kinds of status. UE1 1310 performing a search procedure may have already been connected to the Wi-Fi direct multi-group network or may not yet have been connected to the Wi-Fi direct multi-group network. Also, search-target UE which is searched for by UE1 1310 may have already been connected to the Wi-Fi direct multi-group network or may not yet have been connected to the Wi-Fi direct multi-group network.

The other UE (UE2 1320 and UE3 1330) which may form a P2P group with UE1 1310 may be UE in which the Wi-Fi direct communication application is installed. This is because the other UE (UE2 1320 and UE3 1330) uses wireless resources of the other UE (UE2 1320 and UE3 1330) for indirect access of UE1 1310 to the infrastructure network. A certain compensation may be given for an operation of the other UE (UE2 1320 and UE3 1330) as a gateway or service providing UE rather than service requesting UE.

Therefore, the other UE (UE2 1320 and UE3 1330) forming a P2P group with UE1 1310 may be UE in which the Wi-Fi direct communication application is installed, and may be compensated for an operation as a gateway or service providing UE in the Wi-Fi direct multi-group network by a Wi-Fi direct multi-group network server.

For example, the certain compensation may be a right for the other UE (UE2 1320 and UE3 1330) which has operated as a gateway or a service providing P2P group owner to access the infrastructure network later as service requesting UE via the Wi-Fi direct multi-group network. Such a compensation may induce UE which can operate as a gateway or a service providing P2P group owner to participate in the Wi-Fi direct multi-group network, and such participation may lead to an extension of the Wi-Fi direct multi-group network.

At least one piece of the other UE (UE2 1320 and UE3 1330) found by UE1 1310 operating as service requesting UE may be set as a gateway or service providing UE. As an example, UE1 1310 operating as service requesting UE may receive capability information from the other UE (UE2 1320 and UE3 1330) through the search procedure and form a P2P group with at least one piece of other UE on the basis of the capability information.

For example, the capability information may include information of whether the other UE (UE2 1320 and UE3 1330) can operate as a gateway and/or service providing UE, uplink/downlink data rates at which the other UE (UE2 1320 and UE3 1330) can perform transfer as a gateway and/or service providing UE, information on uplink/downlink data amounts that can be transferred by the other UE (UE2 1320 and UE3 1330) operating as a gateway and/or service providing UE, and the like. The available uplink/downlink data rates, the information on available uplink/downlink data amounts, and the like may be determined on the basis of a distance between UE1 1310 and the other UE which has generated the capability information.

For rapid access to the infrastructure network, UE1 1310 may form a P2P group first with UE capable of operating as service providing UE. When there are a plurality of pieces of UE capable of operating as service providing UE, at least one piece of UE which will form a P2P group may be determined from among the plurality of pieces of UE capable of operating as service providing UE in consideration of capability information transmitted by the plurality of pieces of UE capable of operating as service providing UE.

When there is no UE capable of operating as service providing UE, UE1 1310 may form a P2P group with UE capable of operating as a gateway. Likewise, when there are a plurality of pieces of UE capable of operating as a gateway, at least one piece of UE which will form a P2P group may be determined from among the plurality of pieces of UE capable of operating as a gateway in consideration of capability information transmitted by the plurality of pieces of UE capable of operating as a gateway.

UE1 1310 operating as service requesting UE may transmit generated uplink data for requesting data of a specific webpage (e.g., www.google.com) to a gateway operating as a P2P group owner or a service providing P2P group owner. The uplink data may include identification information (e.g., an IPv4 or IPv6 address) of the gateway operating as a P2P group owner and information for requesting transfer to the infrastructure network.

When UE1 1310 operating as service requesting UE is connected to a gateway (e.g., UE3 1330), the gateway (UE3 1330) may receive the uplink data from UE1 1310 operating as service requesting UE and search for another gateway or service providing UE. When service providing UE (UE4 1340) is found, the gateway (UE3 1330) may transfer the uplink data to the service providing UE (UE4 1340) using an IPv6 address of the service providing UE (UE4 1340) acquired in the search process.

As described above, for rapid access of UE1 1310 to the infrastructure network, the gateway (UE3 1330) may form a P2P group first with UE capable of operating as service providing UE. When there are a plurality of pieces of UE capable of operating as a service providing P2P group owner, at least one piece of UE which will form a P2P group may be determined from among the plurality of pieces of UE capable of operating as a service providing P2P group owner in consideration of capability information transmitted by the plurality of pieces of UE capable of operating as a service providing P2P group owner.

When there is no UE capable of operating as service providing UE, the gateway (UE3 1330) may form a P2P group with UE capable of operating as another gateway. Likewise, when there are a plurality of pieces of UE capable of operating as another gateway, at least one piece of UE which will form a P2P group may be determined from among the plurality of pieces of UE capable of operating as another gateway in consideration of capability information transmitted by the plurality of pieces of UE capable of operating as another gateway.

The service providing UE (UE4 1340) may receive the uplink data from the gateway (UE3 1330) and transfer the received uplink data to a network infrastructure (e.g., an AP 1360).

The uplink data may include identification information (e.g., IPv6 addresses) of the service requesting UE, the gateway, and the service providing UE.

The uplink data may be transferred to a destination server via the Internet. When there is downlink data which is a response to the uplink data (e.g., a request for data of a specific webpage (e.g., www.google.com)), the downlink data may be transmitted to UE1 1310 operating as service requesting UE via a downlink.

A Wi-Fi direct multi-group network for transmitting the downlink data to UE1 1310 operating as service requesting UE (referred to as a downlink Wi-Fi direct multi-group network below) may differ from a Wi-Fi direct multi-group network for transmitting the uplink data from UE1 1310 operating as service requesting UE (referred to as an uplink Wi-Fi direct multi-group network below).

There is a probability that a gateway and service providing UE constituting an uplink Wi-Fi direct multi-group network cannot be used to constitute a downlink Wi-Fi direct multi-group network for transmitting downlink data according to movement of UE. For example, UE3 1330 which has served as a gateway during uplink transmission may be moved away from UE1 1310 due to movement of a user. In this case, UE3 1330 cannot serve as a gateway any more in the uplink Wi-Fi direct multi-group network.

Likewise, UE4 1340 which has served as service providing UE during uplink transmission may be moved away from the AP 1360 due to movement of a user. In this case, UE4 1340 cannot serve as service providing UE any more in the uplink Wi-Fi direct multi-group network.

According to an exemplary embodiment of the present invention, information of UE constituting the uplink Wi-Fi direct multi-group network may be used first to constitute a downlink Wi-Fi direct multi-group network. In other words, the uplink Wi-Fi direct multi-group network may be used as a downlink Wi-Fi direct multi-group network.

When UE constituting the uplink Wi-Fi direct multi-group network cannot be used to constitute a downlink Wi-Fi direct multi-group network, other UE (e.g., UE5 1350) may be found to constitute a downlink Wi-Fi direct multi-group network, and the downlink data may be transferred to UE1 1310 operating as service requesting UE.

According to another exemplary embodiment of the present invention, information of UE constituting the uplink Wi-Fi direct multi-group network may not be used to constitute a downlink Wi-Fi direct multi-group network, and a downlink Wi-Fi direct multi-group network may be configured through a new Wi-Fi direct multi-group network configuration procedure.

The above-described exemplary embodiments of the present invention may be implemented in the form of program instructions that may be executed through various computer components and recorded on a computer-readable recording medium. The computer-readable recording medium may include program instructions, data files, data structures, and the like individually or in combination. The program instructions recorded on the computer-readable recording medium may be specially designed for the present invention or may be well-known to and used by those or ordinary skill in the art of computer software. Examples of the computer-readable recording medium include magnetic media such as a hard disk, a floppy disk, and a magnetic tape, optical media such as a compact disc-read only memory (CD-ROM) and a digital versatile disc (DVD), magneto-optical media such as a floptical disk, and hardware devices such as a ROM, a random access memory (RAM), a flash memory, and the like that are specially designed to store and execute program instructions. Examples of the program instructions include high-level language codes that may be executed by a computer using an interpreter or the like as well as machine code generated by a compiler or the like. The hardware devices may be configured to operate as one or more software modules to perform operations of the present invention, and vice versa.

Although the present invention has been described with reference to specific matters, such as detailed components, limited exemplary embodiments, and drawings, they are provided only to assist the overall understanding of the present invention, and the present invention is not limited to the exemplary embodiments. Various changes and modifications can be made from the disclosure by those of ordinary skill in the technical field to which the present invention pertains.

Therefore, the spirit of the present invention should not be limited to the above-described exemplary embodiments, and the following claims and equivalents thereof fall within the scope of the present invention.

What is claimed is:

1. A method for communication in a wireless fidelity (Wi-Fi) direct multi-group network, the method comprising:
   receiving, by a Wi-Fi direct multi-group network server, a request for transmission of a Wi-Fi direct communication application for a Wi-Fi direct multi-group communication service from an user equipment (UE) directly or indirectly through a relay server; and
   transmitting, by the Wi-Fi direct multi-group network server, the Wi-Fi direct communication application to the UE directly or indirectly through the relay server,
   wherein the Wi-Fi direct multi-group network is formed based on at least one peer-to-peer (P2P) group for performing direct inter-terminal communication based on Wi-Fi direct, and
   wherein the Wi-Fi direct communication application determines destination address information for communication of the UE in the Wi-Fi direct multi-group network,
   wherein, when the UE operates as a gateway in the Wi-Fi direct multi-group network and performs uplink transmission to other UE in the Wi-Fi direct multi-group network, the Wi-Fi direct communication application sets the destination address information to an Internet protocol version 6 (IPv6) address of the other UE, and
   wherein the gateway is coupled to the other UE based on a plurality of media access control (MAC) entities in the Wi-Fi direct multi-group network and provides connectivity between the at least one P2P group.

2. The method of claim 1, wherein, when the UE performs uplink transmission to other UE in the Wi-Fi direct multi-group network, the Wi-Fi direct communication application sets the destination address information to an Internet protocol version 6 (IPv6) address of the other UE based on a role of the UE in the Wi-Fi direct multi-group network.

3. A wireless fidelity (Wi-Fi) direct multi-group network server for communication in a Wi-Fi direct multi-group network, comprising:
    a communication unit configured to communicate with a relay server and an user equipment (UE);
    a processor operatively connected to the communication unit and configured to: receive a request for transmission of a Wi-Fi direct communication application for a Wi-Fi direct multi-group communication service from the UE directly or indirectly through a relay server; and transmit the Wi-Fi direct communication application to the UE directly or indirectly through the relay server, wherein the Wi-Fi direct multi-group network is formed based on at least one peer-to-peer (P2P) group for performing direct inter-terminal communication based on Wi-Fi direct, and wherein the Wi-Fi direct communication application determines destination address information for communication of the UE in the Wi-Fi direct multi-group network,
        wherein, when the UE operates as a gateway in the Wi-Fi direct multi-group network and performs uplink transmission to other UE in the Wi-Fi direct multi-group network, the Wi-Fi direct communication application sets the destination address information to an Internet protocol version 6 (IPv6) address of the other UE, and
        wherein the gateway is coupled to the other UE based on a plurality of media access control (MAC) entities in the Wi-Fi direct multi-group network and provides connectivity between the at least one P2P group.

4. The Wi-Fi direct multi-group network server of claim 3,
    wherein, when the UE performs uplink transmission to other UE in the Wi-Fi direct multi-group network, the Wi-Fi direct communication application sets the destination address information to an Internet protocol version 6 (IPv6) address of the other UE based on a role of the UE in the Wi-Fi direct multi-group network.

5. A method for communication in a wireless fidelity (Wi-Fi) direct multi-group network, the method comprising:
    receiving, by a Wi-Fi direct multi-group network server, a request for transmission of a Wi-Fi direct communication application for a Wi-Fi direct multi-group communication service from an user equipment (UE) directly or indirectly through a relay server; and
    transmitting, by the Wi-Fi direct multi-group network server, the Wi-Fi direct communication application to the UE directly or indirectly through the relay server,
wherein the Wi-Fi direct multi-group network is formed based on at least one peer-to-peer (P2P) group for performing direct inter-terminal communication based on Wi-Fi direct, and
    wherein the Wi-Fi direct communication application determines destination address information for communication of the UE in the Wi-Fi direct multi-group network,
    wherein, when the UE operates as a gateway in the Wi-Fi direct multi-group network, the UE is coupled to at least one piece of first other UE as a P2P group owner through a P2P media access control (MAC) entity and is coupled to second other UE as a legacy client through a wireless local area network (WLAN) MAC entity, and
    wherein the Wi-Fi direct communication application sets destination address information for uplink transmission from the UE to the second other UE to an Internet protocol version 6 (IPv6) address of the second other UE.

6. A method for communication in a wireless fidelity (Wi-Fi) direct multi-group network, the method comprising:
    receiving, by a Wi-Fi direct multi-group network server, a request for transmission of a Wi-Fi direct communication application for a Wi-Fi direct multi-group communication service from an user equipment (UE) directly or indirectly through a relay server; and
    transmitting, by the Wi-Fi direct multi-group network server, the Wi-Fi direct communication application to the UE directly or indirectly through the relay server,
wherein the Wi-Fi direct multi-group network is formed based on at least one peer-to-peer (P2P) group for performing direct inter-terminal communication based on Wi-Fi direct, and
    wherein the Wi-Fi direct communication application determines destination address information for communication of the UE in the Wi-Fi direct multi-group network,
    wherein, when the UE operates as a gateway in the Wi-Fi direct multi-group network, the UE is coupled to first other UE as a P2P group client through a P2P media access control (MAC) entity and is coupled to second other UE as a legacy client through a wireless local area network (WLAN) MAC entity, and wherein the Wi-Fi direct communication application sets destination address information for uplink transmission from the UE to the second other UE to an Internet protocol version 6 (IPv6) address of the second other UE.

7. A wireless fidelity (Wi-Fi) direct multi-group network server for communication in a Wi-Fi direct multi-group network, comprising:
    a communication unit configured to communicate with a relay server and an user equipment (UE);
    a processor operatively connected to the communication unit and configured to:
receive a request for transmission of a Wi-Fi direct communication application for a Wi-Fi direct multi-group communication service from the UE directly or indirectly through a relay server; and transmit the Wi-Fi direct communication application to the UE directly or indirectly through the relay server, wherein the Wi-Fi direct multi-group network is formed based on at least one peer-to-peer (P2P) group for performing direct inter-terminal communication based on Wi-Fi direct, and
    wherein the Wi-Fi direct communication application determines destination address information for communication of the UE in the Wi-Fi direct multi-group network,
    wherein, when the UE operates as a gateway in the Wi-Fi direct multi-group network, the UE is coupled to at least one piece of first other UE as a P2P group owner through a P2P media access control (MAC) entity and is coupled to second other UE as a legacy client through a wireless local area network (WLAN) MAC entity, and
    wherein the Wi-Fi direct communication application sets destination address information for uplink transmission from the UE to the second other UE to an Internet protocol version 6 (IPv6) address of the second other UE.

8. A wireless fidelity (Wi-Fi) direct multi-group network server for communication in a Wi-Fi direct multi-group network, comprising:
    a communication unit configured to communicate with a relay server and an user equipment (UE);
    a processor operatively connected to the communication unit and configured to:

receive a request for transmission of a Wi-Fi direct communication application for a Wi-Fi direct multi-group communication service from the UE directly or indirectly through a relay server; and transmit the Wi-Fi direct communication application to the UE directly or indirectly through the relay server, wherein the Wi-Fi direct multi-group network is formed based on at least one peer-to-peer (P2P) group for performing direct inter-terminal communication based on Wi-Fi direct, and wherein the Wi-Fi direct communication application determines destination address information for communication of the UE in the Wi-Fi direct multi-group network, wherein, when the UE operates as a gateway in the Wi-Fi direct multi-group network, the UE is coupled to first other UE as a P2P group client through a P2P media access control (MAC) entity and is coupled to second other UE as a legacy client through a wireless local area network (WLAN) MAC entity, and wherein the Wi-Fi direct communication application sets destination address information for uplink transmission from the UE to the second other UE to an Internet protocol version 6 (IPv6) address of the second other UE.

\* \* \* \* \*